(12) United States Patent
Watanabe et al.

(10) Patent No.: US 10,836,429 B2
(45) Date of Patent: Nov. 17, 2020

(54) ANGLE SENSOR AND ANGLE SENSOR SYSTEM

(71) Applicant: TDK CORPORATION, Tokyo (JP)

(72) Inventors: Kazuya Watanabe, Tokyo (JP); Hiraku Hirabayashi, Tokyo (JP)

(73) Assignee: TDK CORPORATION, Tokyo (JP)

(*) Notice: Subject to any disclaimer, the term of this patent is extended or adjusted under 35 U.S.C. 154(b) by 444 days.

(21) Appl. No.: 15/649,793

(22) Filed: Jul. 14, 2017

(65) Prior Publication Data

US 2018/0022386 A1    Jan. 25, 2018

(30) Foreign Application Priority Data

Jul. 20, 2016  (JP) ................... 2016-142013
Jun. 23, 2017  (JP) ................... 2017-122773

(51) Int. Cl.
*G01D 5/244* (2006.01)
*G01B 7/30* (2006.01)
*G01D 5/14* (2006.01)
*B62D 15/02* (2006.01)
(Continued)

(52) U.S. Cl.
CPC ......... *B62D 15/0245* (2013.01); *B62D 5/049* (2013.01); *G01B 7/30* (2013.01); *G01D 5/145* (2013.01); *G01D 5/2448* (2013.01); *G01L 5/221* (2013.01)

(58) Field of Classification Search
CPC ...... B62D 15/0245; B62D 5/049; G01B 7/30; G01D 5/145; G01L 5/221
See application file for complete search history.

(56) References Cited

U.S. PATENT DOCUMENTS

| 6,389,373 B1* | 5/2002 | Ohya ................. H03M 1/485 347/116 |
| 2012/0095712 A1* | 4/2012 | Komasaki ............. G01D 3/036 702/94 |
| 2014/0021943 A1 | 1/2014 | Watanabe et al. |

(Continued)

FOREIGN PATENT DOCUMENTS

JP    S60-170710 A    9/1985
JP    H07-218239 A    8/1995

(Continued)

*Primary Examiner* — Stephanie E Bloss
(74) *Attorney, Agent, or Firm* — Oliff PLC

(57) ABSTRACT

An angle sensor includes a detection signal generation unit for generating detection signals, an angle detection unit for generating a detected angle value on the basis of the detection signals, and a condition determination apparatus. The condition determination apparatus includes a determination value generation unit for generating a determination value to be used for determining the condition of the angle sensor, and a determination unit for determining the condition of the angle sensor. The angle detection unit includes a common correction processing unit for performing common correction processing for converting uncorrected signals, which have correspondence with the detection signals, into common corrected signals to be used for the generation of the detected angle value and the generation of the determination value. The common correction processing reduces an angular error occurring in the detected angle value, and narrows the variation range of the determination value.

19 Claims, 10 Drawing Sheets

(51) Int. Cl.
    *B62D 5/04*     (2006.01)
    *G01L 5/22*     (2006.01)

(56) References Cited

U.S. PATENT DOCUMENTS

| | | | |
|---|---|---|---|
| 2014/0035493 A1* | 2/2014 | Ajima | H02P 21/18 |
| | | | 318/400.04 |
| 2014/0336878 A1* | 11/2014 | Yanai | G01B 7/31 |
| | | | 701/41 |
| 2015/0077093 A1 | 3/2015 | Saito et al. | |
| 2015/0108971 A1* | 4/2015 | Granig | G01R 33/091 |
| | | | 324/252 |
| 2015/0176963 A1* | 6/2015 | Diaconu | G01R 33/077 |
| | | | 702/95 |
| 2015/0176964 A1* | 6/2015 | Uberti | G01B 7/30 |
| | | | 702/95 |
| 2017/0322052 A1 | 11/2017 | Paul et al. | |

FOREIGN PATENT DOCUMENTS

| | | |
|---|---|---|
| JP | 2006-138822 A | 6/2006 |
| JP | 2006-284419 A | 10/2006 |
| JP | 2012-021842 A | 2/2012 |

* cited by examiner

ANGLE SENSOR AND ANGLE SENSOR SYSTEM

BACKGROUND OF THE INVENTION

1. Field of the Invention

The present invention relates to an angle sensor and an angle sensor system each including a condition determination apparatus.

2. Description of the Related Art

In recent years, angle sensors have been widely used in various applications, such as detection of the rotational position of a steering wheel or a power steering motor in an automobile. The angle sensors generate a detected angle value having a correspondence with an angle to be detected. Examples of the angle sensors include a magnetic angle sensor. An angle sensor system using the magnetic angle sensor is typically provided with a magnetic field generation unit for generating a rotating magnetic field whose direction rotates in response to the rotation or linear movement of an object. The magnetic field generation unit is a magnet, for example. The angle to be detected by the magnetic angle sensor is, for example, the angle that the direction of the rotating magnetic field in a reference position forms with respect to a reference direction.

Among known angle sensors is one that includes a detection signal generation unit for generating a plurality of detection signals of different phases and generates a detected angle value by performing an operation using the plurality of detection signals. In a magnetic angle sensor, the detection signal generation unit includes a plurality of magnetic detection elements. Each of the plurality of magnetic detection elements includes, for example, a spin-valve magnetoresistance (MR) element including a magnetization pinned layer whose magnetization direction is pinned, a free layer whose magnetization direction varies depending on the direction of the rotating magnetic field, and a nonmagnetic layer located between the magnetization pinned layer and the free layer.

In the event of a failure of the angle sensor caused by a failure of the detection signal generation unit or other factors, some error exceeding an allowable range may occur in the detected angle value. The angle sensor thus needs to be provided with a function with which to detect a failure. The error occurring in the detected angle value will hereinafter be referred to as angular error.

JP 2012-021842A describes a technology to detect a failure of a rotation angle detection apparatus that detects a rotation angle on the basis of two phase signals having 90° different phases. The technology detects the failure by monitoring the sum of squares of the two phase signals. JP 2012-021842A also describes a technology to detect a failure of a rotation angle detection apparatus that detects a rotation angle on the basis of three or more phase signals having equally different phases. The technology detects the failure by monitoring a total sum of the three or more phase signals.

US 2015/0077093 A1 describes a technology to detect a failure of a rotation angle detection apparatus that detects a rotation angle on the basis of first and second sinusoidal signals having a phase difference other than 90° or 180°. The technology detects the failure on the basis of the first and second sinusoidal signals and the phase difference therebetween.

According to the technology described in each of JP 2012-021842A and US 2015/0077093 A1, a determination value indicative of whether the rotation angle detection apparatus has failed is generated by performing an operation using a plurality of detection signals, and if the determination value exceeds a predetermined range, it is determined that the rotation angle detection apparatus has failed. When the rotation angle detection apparatus has not failed, the determination value ideally shows a constant ideal value regardless of the angle to be detected. In the event of a failure of the rotation angle detection apparatus, the determination value becomes different from the ideal value.

For the angle sensor that has the function of determining whether the angle sensor has failed by using such a determination value, there are cases where an angular error occurs and the determination value differs from the ideal value even if the angle sensor has not failed. This may occur when, for example, at least one of the center value, amplitude, and phase of at least one of the detection signals deviates from its desired value.

For example, in the case of a magnetic angle sensor, ideally, the plurality of detection signals each have a waveform of a sinusoidal curve (including a sine waveform and a cosine waveform) when the direction of the rotating magnetic field changes with a constant angular velocity and the angle to be detected varies with a predetermined period. However, there are cases where the waveforms of the detection signals are distorted from a sinusoidal curve. Examples of causes for the distortion of the waveforms of the detection signals include a magnetic anisotropy of the free layer in the MR element in the magnetization direction of the magnetization pinned layer of the MR element, or variations of the magnetization direction of the magnetization pinned layer of the MR element due to the effect of the rotating magnetic field or other factors. If the waveforms of the detection signals are distorted, the determination value can become different from the ideal value without a failure of the angle sensor.

A determination value differing from the ideal value without a failure of the angle sensor leads to lower accuracy of determination whether the angle sensor has failed.

SUMMARY OF THE INVENTION

It is an object of the present invention to provide an angle sensor and an angle sensor system that enable accurate determination of the condition of the angle sensor, such as whether the angle sensor has failed.

An angle sensor of the present invention includes: a detection signal generation unit for generating a plurality of detection signals each of which has a correspondence with an angle to be detected; an angle detection unit for generating a detected angle value on the basis of the plurality of detection signals, the detected angle value having a correspondence with the angle to be detected; and a condition determination apparatus. The condition determination apparatus includes: a determination value generation unit for generating a determination value to be used for determining whether the angle sensor is in a predetermined condition; and a determination unit for determining whether the angle sensor is in the predetermined condition on the basis of the determination value.

The angle detection unit includes a common correction processing unit for performing common correction processing for converting a plurality of uncorrected signals, which have correspondence with the plurality of detection signals, into a plurality of common corrected signals to be used for the generation of the detected angle value and the generation of the determination value. The determination value generation unit is configured to generate the determination value on the basis of the plurality of common corrected signals. The common correction processing is processing for converting the plurality of uncorrected signals into the plurality of common corrected signals so that an angular error occurring in the detected angle value is reduced relative to the case where the detected angle value is generated using the plurality of uncorrected signals without the application of the common correction processing, and so that a range over which the determination value varies depending on the angle to be detected is narrower than in the case where the determination value is generated using the plurality of uncorrected signals without the application of the common correction processing.

In the angle sensor of the present invention, the predetermined condition may be a condition in which the angle sensor has not failed.

In the angle sensor of the present invention, the plurality of common corrected signals may be a first common corrected signal and a second common corrected signal. When the angle to be detected varies with a predetermined period, each of the first and second common corrected signals contains an ideal component which varies periodically in such a manner as to trace an ideal sinusoidal curve. The ideal component of the first common corrected signal and the ideal component of the second common corrected signal have a phase difference of 90°. The first common corrected signal and the second common corrected signal are of the same amplitude. In such a case, the determination value generation unit may be configured to generate the determination value by performing an operation including determining the sum of the square of the first common corrected signal and the square of the second common corrected signal.

In the angle sensor of the present invention, the angle to be detected may be an angle that the direction of a rotating magnetic field in a reference position forms with respect to a reference direction. In such a case, the detection signal generation unit may include a plurality of detection circuits for generating the plurality of detection signals. Each of the plurality of detection circuits may include at least one magnetic detection element for detecting the rotating magnetic field. In such a case, the at least one magnetic detection element may include a plurality of magnetoresistance elements connected in series. Each of the plurality of magnetoresistance elements may include a magnetization pinned layer whose magnetization direction is pinned, a free layer whose magnetization direction varies depending on the direction of the rotating magnetic field, and a nonmagnetic layer located between the magnetization pinned layer and the free layer.

In the angle sensor of the present invention, the common correction processing may include processing for correcting offsets of the plurality of uncorrected signals.

In the angle sensor of the present invention, the common correction processing may include processing for normalizing the amplitudes of the plurality of uncorrected signals.

In the angle sensor of the present invention, the plurality of uncorrected signals may be a first uncorrected signal and a second uncorrected signal. The plurality of common corrected signals may be a first common corrected signal and a second common corrected signal. When the angle to be detected varies with a predetermined period, each of the first uncorrected signal, the second uncorrected signal, the first common corrected signal and the second common corrected signal contains an ideal component which varies periodically in such a manner as to trace an ideal sinusoidal curve. In such a case, the common correction processing may include processing for making a phase difference between the ideal components of the first and second common corrected signals be 90° irrespective of a phase difference between the ideal components of the first and second uncorrected signals, and making the first and second common corrected signals be of the same amplitude.

In the angle sensor of the present invention, when the angle to be detected varies with a predetermined period, each of the plurality of detection signals may contain an ideal component which varies periodically in such a manner as to trace an ideal sinusoidal curve, and an error component corresponding to a third harmonic of the ideal component. In such a case, the angle detection unit may further include a conversion processing unit for performing conversion processing for converting the plurality of detection signals into the plurality of uncorrected signals each containing a reduced error component relative to the error component contained in each of the plurality of detection signals.

In the angle sensor of the present invention, when the angle to be detected varies with a predetermined period, each of the plurality of uncorrected signals may contain an ideal component which varies periodically in such a manner as to trace an ideal sinusoidal curve, and an error component corresponding to a third harmonic of the ideal component. In such a case, the common correction processing may include processing for causing each of the plurality of common corrected signals to contain a reduced error component relative to the error component contained in each of the plurality of uncorrected signals.

In the angle sensor of the present invention, the angle detection unit may further include a non-common correction processing unit for performing non-common correction processing for converting the plurality of common corrected signals into a first angle operation signal and a second angle operation signal which are used for an operation for generating the detected angle value and not used for the generation of the determination value. The non-common correction processing may be processing for reducing an angular error occurring in the detected angle value relative to the case where the detected angle value is generated using the plurality of common corrected signals without the application of the non-common correction processing. In such a case, the angular error to be reduced by the non-common correction processing may contain at least one of a first angular error component and a second angular error component. When the angle to be detected varies with a predetermined period, the first angular error component varies with a period equal to the predetermined period, and the second angular error component varies with a period of ½ the predetermined period. Further, in such a case, the angular error to be reduced by the non-common correction processing may contain a third angular error component. When the angle to be detected varies with a predetermined period, the third angular error component varies with a period of ¼ the predetermined period.

An angle sensor system of the present invention includes the angle sensor of the present invention and a physical information generation unit for generating physical information having a correspondence with the angle to be detected. The detection signal generation unit is configured to generate the plurality of detection signals by detecting the physical information.

In the angle sensor system of the present invention, the physical information generation unit may be a magnetic field generation unit for generating a rotating magnetic field as physical information. In such a case, the angle to be detected may be an angle that the direction of the rotating magnetic field in a reference position forms with respect to a reference direction.

In the angle sensor system of the present invention, the relative position of the physical information generation unit with respect to the angle sensor may vary so that the angle to be detected varies. In such a case, the relative position of the physical information generation unit with respect to the angle sensor may vary in such a way as to rotate about a central axis. Alternatively, the relative position of the physical information generation unit with respect to the angle sensor may vary in a linear fashion.

According to the angle sensor and the angle sensor system of the invention, the common corrected signals yielded by the common correction processing are used for the generation of the detected angle value and the generation of the determination value. This enables accurate determination of the condition of the angle sensor.

Other and further objects, features and advantages of the present invention will appear more fully from the following description.

DETAILED DESCRIPTION OF THE PREFERRED EMBODIMENTS

First Embodiment

Preferred embodiments of the present invention will now be described in detail with reference to the drawings. First, reference is made to FIG. 1 to describe the general configuration of an angle sensor system according to a first embodiment of the invention. The angle sensor system according to the first embodiment includes an angle sensor 1 according to the first embodiment and a physical information generation unit 5.

Figure 1:
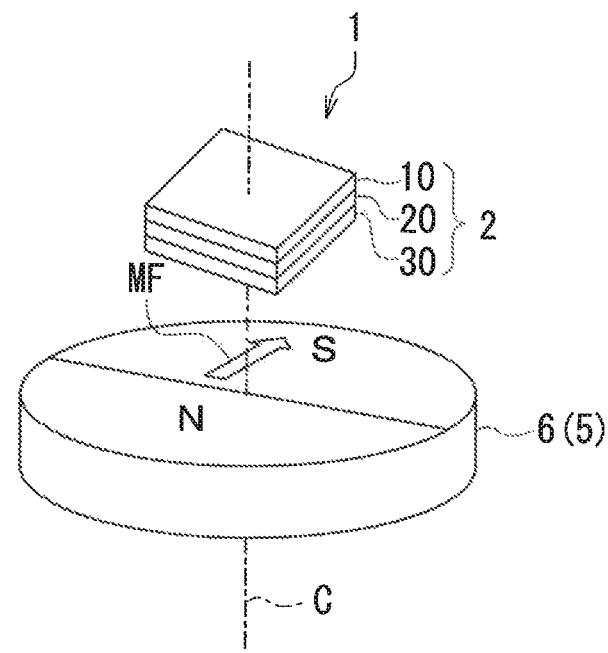
FIG. 1 is a perspective view illustrating the general configuration of an angle sensor system according to a first embodiment of the invention.

The angle sensor 1 according to the first embodiment is configured to generate a detected angle value $\theta s$ having a correspondence with an angle $\theta$ to be detected. The physical information generation unit 5 is configured to generate physical information having a correspondence with the angle $\theta$ to be detected. The relative position of the physical information generation unit 5 with respect to the angle sensor 1 varies so that the angle $\theta$ to be detected varies. The angle sensor 1 according to the present embodiment is particularly a magnetic angle sensor. The physical information generation unit 5 of the present embodiment is particularly a magnetic field generation unit for generating a rotating magnetic field MF as physical information. FIG. 1 shows a magnet 6 of a cylindrical shape as an example of the magnetic field generation unit. The magnet 6 has an N pole and an S pole that are arranged symmetrically with respect to an imaginary plane including the central axis of the cylindrical shape.

The angle sensor 1 according to the present embodiment detects the rotating magnetic field MF generated by the magnet 6. The relative position of the magnet 6 with respect to the angle sensor 1 varies in such a way as to rotate about the central axis C. This is achieved by a rotation of either one of the angle sensor 1 and the magnet 6 about the predetermined central axis C in response to a rotational movement of a moving object (not illustrated). Alternatively, the magnet 6 and the angle sensor 1 may rotate in mutually opposite directions, or may rotate in the same direction with mutually different angular velocities. The direction of the rotating magnetic field MF to be detected by the angle sensor 1 rotates about the central axis C as the relative position of the magnet 6 with respect to the angle sensor 1 varies.

The angle $\theta$ to be detected is an angle that the direction of the rotating magnetic field MF in a reference position forms with respect to a reference direction. The reference position is located within an imaginary plane parallel to an end face of the magnet 6. This imaginary plane will hereinafter be referred to as the reference plane. In the reference plane, the direction of the rotating magnetic field MF generated by the magnet 6 rotates about the reference position. The reference direction is located within the reference plane and intersects the reference position. In the following description, the direction of the rotating magnetic field MF in the reference position refers to a direction located within the reference plane. The angle sensor 1 is placed to face the aforementioned end face of the magnet 6. As will be described later in relation to other embodiments, the magnetic field generation unit is not limited to the magnet 6 shown in FIG. 1.

The angle sensor 1 includes a detection signal generation unit 2 for generating a plurality of detection signals each having a correspondence with the angle θ to be detected. The detection signal generation unit 2 generates the plurality of detection signals by detecting the rotating magnetic field MF as physical information. In the present embodiment, the detection signal generation unit 2 generates first to third detection signals S11, S12 and S13 as the plurality of detection signals. In this case, the detection signal generation unit 2 includes a first detection circuit 10 for generating the first detection signal S11, a second detection circuit 20 for generating the second detection signal S12, and a third detection circuit 30 for generating the third detection signal S13. For ease of understanding, FIG. 1 illustrates the first to third detection circuits 10, 20 and 30 as separate components. However, the first to third detection circuits 10, 20 and 30 may be integrated into a single component. Further, while in FIG. 1 the first to third detection circuits 10, 20 and 30 are stacked in a direction parallel to the central axis C, the order of stacking may be inversed from that shown in FIG. 1. Each of the first to third detection circuits 10, 20 and 30 includes at least one magnetic detection element for detecting the rotating magnetic field MF.

Figure 2:
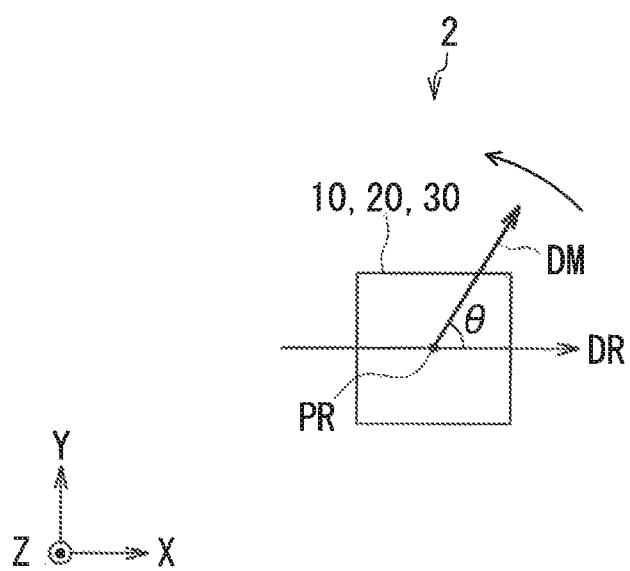
FIG. 2 is an explanatory diagram illustrating the definitions of directions and angles used in the first embodiment of the invention.

Definitions of directions and angles used in the present embodiment will now be described with reference to FIG. 1 and FIG. 2. First, Z direction is the direction parallel to the central axis C shown in FIG. 1 and upward in FIG. 1. FIG. 2 illustrates the Z direction as the direction out of the plane of FIG. 2. Next, X and Y directions are two directions that are perpendicular to the Z direction and orthogonal to each other. FIG. 2 illustrates the X direction as the rightward direction, and the Y direction as the upward direction. Further, −X direction is the opposite direction to the X direction, and −Y direction is the opposite direction to the Y direction.

The reference position PR is the position where the angle sensor 1 detects the rotating magnetic field MF. The reference direction DR is assumed to be the X direction. As mentioned above, the angle θ to be detected is the angle that the direction DM of the rotating magnetic field MF in the reference position PR forms with respect to the reference direction DR. The direction DM of the rotating magnetic field MF is assumed to rotate counterclockwise in FIG. 2. The angle θ will be expressed in positive values when seen counterclockwise from the reference direction DR, and in negative values when seen clockwise from the reference direction DR.

Figure 3:
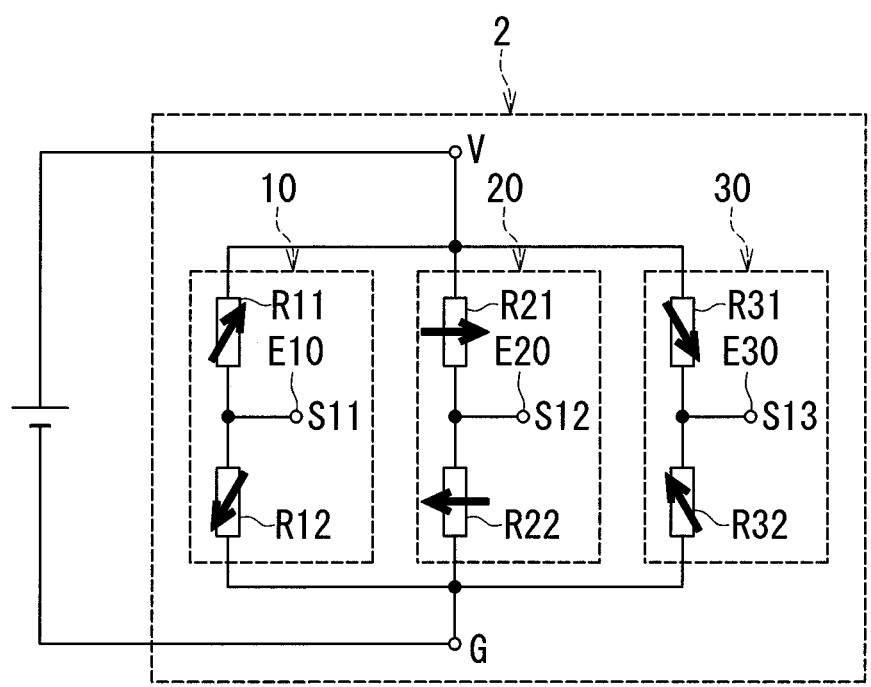
FIG. 3 is a circuit diagram illustrating the configuration of a detection signal generation unit of an angle sensor according to the first embodiment of the invention.
Figure 3:
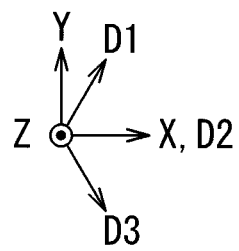

The configuration of the detection signal generation unit 2 will now be described in detail with reference to FIG. 3. FIG. 3 is a circuit diagram illustrating the configuration of the detection signal generation unit 2. As mentioned above, the detection signal generation unit 2 includes the first detection circuit 10, the second detection circuit 20, and the third detection circuit 30. The detection signal generation unit 2 further includes a power supply port V and a ground port G. A power supply voltage of predetermined magnitude, such as 5 volts, is applied between the power supply port V and the ground port G.

As the direction DM of the rotating magnetic field MF rotates with a predetermined period T, the angle θ to be detected varies with the predetermined period T. In such a case, all the first to third detection signals S11, S12 and S13 vary periodically with a signal period equal to the predetermined period T. The first to third detection signals S11, S12 and S13 are different in phase from each other.

The first detection circuit 10 includes a pair of serially connected magnetic detection elements R11 and R12, and an output port E10. One end of the magnetic detection element R11 is connected to the power supply port V. The other end of the magnetic detection element R11 is connected to one end of the magnetic detection element R12 and the output port E10. The other end of the magnetic detection element R12 is connected to the ground port G. The output port E10 outputs the first detection signal S11 which corresponds to the potential at the connection point between the magnetic detection elements R11 and R12.

The second detection circuit 20 includes a pair of serially connected magnetic detection elements R21 and R22, and an output port E20. One end of the magnetic detection element R21 is connected to the power supply port V. The other end of the magnetic detection element R21 is connected to one end of the magnetic detection element R22 and the output port E20. The other end of the magnetic detection element R22 is connected to the ground port G. The output port E20 outputs the second detection signal S12 which corresponds to the potential at the connection point between the magnetic detection elements R21 and R22.

The third detection circuit 30 includes a pair of serially connected magnetic detection elements R31 and R32, and an output port E30. One end of the magnetic detection element R31 is connected to the power supply port V. The other end of the magnetic detection element R31 is connected to one end of the magnetic detection element R32 and the output port E30. The other end of the magnetic detection element R32 is connected to the ground port G. The output port E30 outputs the third detection signal S13 which corresponds to the potential at the connection point between the magnetic detection elements R31 and R32.

In the present embodiment, each of the magnetic detection elements R11, R12, R21, R22, R31 and R32 includes a plurality of magnetoresistance (MR) elements connected in series. Each of the plurality of MR elements is a spin-valve MR element, for example. The spin-valve MR element includes a magnetization pinned layer whose magnetization direction is pinned, a free layer which is a magnetic layer whose magnetization direction varies depending on the direction DM of the rotating magnetic field MF, and a nonmagnetic layer located between the magnetization pinned layer and the free layer. The spin-valve MR element may be a TMR element or a GMR element. In the TMR element, the nonmagnetic layer is a tunnel barrier layer. In the GMR element, the nonmagnetic layer is a nonmagnetic conductive layer. The spin-valve MR element varies in resistance depending on the angle that the magnetization direction of the free layer forms with respect to the magnetization direction of the magnetization pinned layer, and has a minimum resistance when the foregoing angle is 0° and a maximum resistance when the foregoing angle is 180°. In FIG. 3, each arrow drawn to overlap a magnetic detection element indicates the magnetization direction of the magnetization pinned layers of the MR elements included in the magnetic detection element.

In the first detection circuit 10, the magnetization pinned layers of the MR elements included in the magnetic detection element R11 are magnetized in a direction that is rotated counterclockwise from the X direction by 60°. This magnetization direction will hereinafter be referred to as the first direction D1. The magnetization pinned layers of MR elements included in the magnetic detection element R12 are magnetized in the opposite direction to the first direction D1. In the first detection circuit 10, the potential at the connection point between the magnetic detection elements R11 and R12 varies depending on the strength of a component in the first direction D1 of the rotating magnetic field MF. Thus, the first detection circuit 10 detects the strength of the component in the first direction D1 of the rotating magnetic field MF and outputs a signal indicative of the strength as the first detection signal S11. The strength of the component in the first direction D1 of the rotating magnetic field MF has a correspondence with the angle θ to be detected.

In the second detection circuit 20, the magnetization pinned layers of the MR elements included in the magnetic detection element R21 are magnetized in the X direction. This magnetization direction will hereinafter be referred to as the second direction D2. The magnetization pinned layers of the MR elements included in the magnetic detection element R22 are magnetized in the opposite direction to the second direction D2, that is, in the −X direction. In the second detection circuit 20, the potential at the connection point between the magnetic detection elements R21 and R22 varies depending on the strength of a component in the second direction D2 of the rotating magnetic field MF. Thus, the second detection circuit 20 detects the strength of the component in the second direction D2 of the rotating magnetic field MF and outputs a signal indicative of the strength as the second detection signal S12. The strength of the component in the second direction D2 of the rotating magnetic field MF has a correspondence with the angle θ to be detected.

In the third detection circuit 30, the magnetization pinned layers of the MR elements included in the magnetic detection element R31 are magnetized in a direction that is rotated clockwise from the X direction by 60°. This magnetization direction will hereinafter be referred to as the third direction D3. The magnetization pinned layers of MR elements included in the magnetic detection element R32 are magnetized in the opposite direction to the third direction D3. In the third detection circuit 30, the potential at the connection point between the magnetic detection elements R31 and R32 varies depending on the strength of a component in the third direction D3 of the rotating magnetic field MF. Thus, the third detection circuit 30 detects the strength of the component in the third direction D3 of the rotating magnetic field MF and outputs a signal indicative of the strength as the third detection signal S13. The strength of the component in the third direction D3 of the rotating magnetic field MF has a correspondence with the angle θ to be detected.

In the light of the production accuracy of the MR elements or other factors, the magnetization directions of the magnetization pinned layers of the plurality of MR elements in the detection circuits 10, 20 and 30 may be slightly different from those described above.

Figure 7:
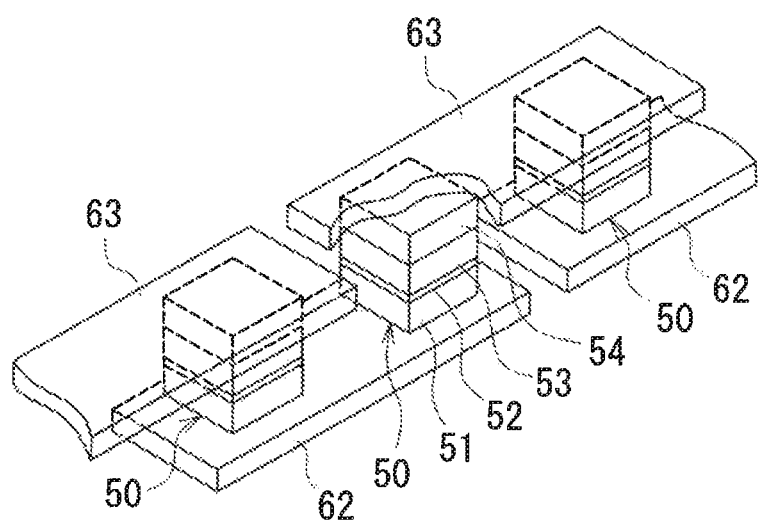
FIG. 7 is a perspective view of a portion of a magnetic detection element shown in FIG. 3.

An example of the configuration of the magnetic detection elements will now be described with reference to FIG. 7. FIG. 7 is a perspective view illustrating a portion of a magnetic detection element in the detection signal generation unit 2 shown in FIG. 3. In this example, the magnetic detection element includes a plurality of lower electrodes 62, a plurality of MR elements 50 and a plurality of upper electrodes 63. The plurality of lower electrodes 62 are arranged on a substrate (not illustrated). Each of the lower electrodes 62 has a long slender shape. Every two lower electrodes 62 that are adjacent to each other in the longitudinal direction of the lower electrodes 62 have a gap therebetween. As shown in FIG. 7, MR elements 50 are provided on the top surfaces of the lower electrodes 62, near opposite ends in the longitudinal direction. Each of the MR elements 50 includes a free layer 51, a nonmagnetic layer 52, a magnetization pinned layer 53, and an antiferromagnetic layer 54 which are stacked in this order, the free layer 51 being closest to the lower electrode 62. The free layer 51 is electrically connected to the lower electrode 62. The antiferromagnetic layer 54 is formed of an antiferromagnetic material. The antiferromagnetic layer 54 is in exchange coupling with the magnetization pinned layer 53 so as to pin the magnetization direction of the magnetization pinned layer 53. The plurality of upper electrodes 63 are arranged over the plurality of MR elements 50. Each of the upper electrodes 63 has a long slender shape, and establishes electrical connection between the respective antiferromagnetic layers 54 of two adjacent MR elements 50 that are arranged on two lower electrodes 62 adjacent in the longitudinal direction of the lower electrodes 62. With such a configuration, the plurality of MR elements 50 in the magnetic detection element shown in FIG. 7 are connected in series by the plurality of lower electrodes 62 and the plurality of upper electrodes 63. It should be appreciated that the layers 51 to 54 of the MR elements 50 may be stacked in an order reverse to that shown in FIG. 7.

As described previously, when the angle θ to be detected varies with the predetermined period T, all the first to third detection signals S11, S12 and S13 vary periodically with the signal period equal to the predetermined period T. When the angle θ to be detected varies with the predetermined period T, each of the detection signals S11, S12 and S13 contains an ideal component and an error component other than the ideal component. The ideal component varies periodically in such a manner as to trace an ideal sinusoidal curve (including a sine waveform and a cosine waveform). The ideal components of the detection signals S11, S12 and S13 are different in phase from each other and have a predetermined phase relationship with each other. In the present embodiment, the ideal components of the detection signals S11 and S12 are different in phase from each other by 60°. The ideal components of the detection signals S12 and S13 are different in phase from each other by 60°. The ideal components of the detection signals S11 and S13 are different in phase from each other by 120°.

The error components of the detection signals S11, S12 and S13 are caused by such factors as a magnetic anisotropy of the free layer 51 of the MR element 50 in the magnetization direction of the magnetization pinned layer 53 of the MR element 50, or a variation of the magnetization direction of the magnetization pinned layer 53 of the MR element 50 due to the effect of the rotating magnetic field MF or other factors. The error components caused by the foregoing factors correspond mainly to the third harmonic of the ideal component.

Figure 4:
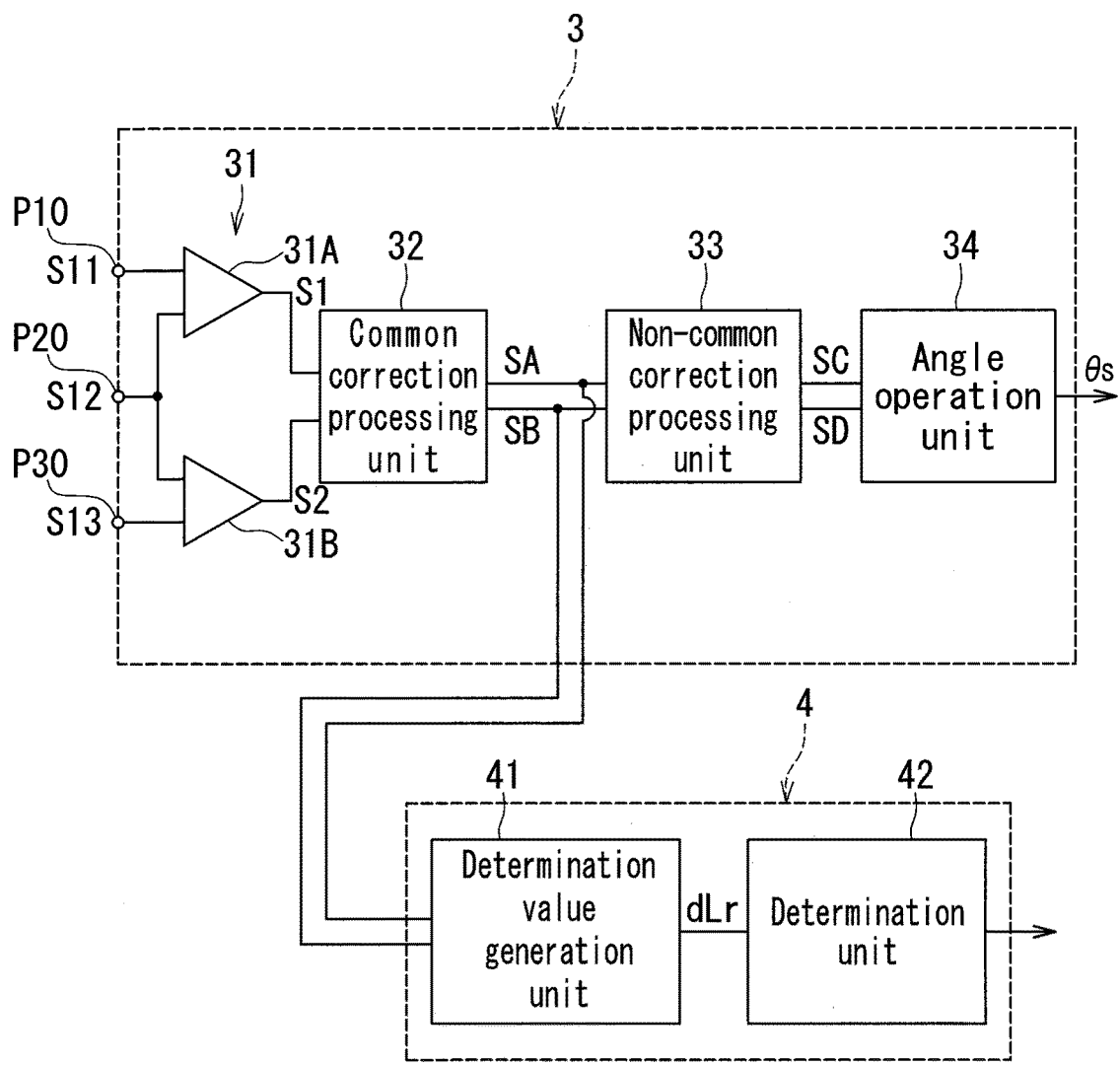
FIG. 4 is a functional block diagram illustrating the configuration of an angle detection unit and a condition determination apparatus of the angle sensor according to the first embodiment of the invention.

Now, components of the angle sensor 1 other than the detection signal generation unit 2 will be described with reference to FIG. 4. The angle sensor 1 includes an angle detection unit 3 and a condition determination apparatus 4 shown in FIG. 4, in addition to the detection signal generation unit 2. FIG. 4 is a functional block diagram illustrating the configuration of the angle detection unit 3 and the condition determination apparatus 4. On the basis of the plurality of detection signals generated by the detection signal generation unit 2, the angle detection unit 3 generates a detected angle value θs having a correspondence with the angle θ to be detected. The angle detection unit 3 and the condition determination apparatus 4 can be implemented by an application-specific integrated circuit (ASIC) or a microcomputer, for example.

The condition determination apparatus 4 includes a determination value generation unit 41 for generating a determination value to be used for determining whether the angle sensor 1 is in a predetermined condition, and a determination unit 42 for determining whether the angle sensor 1 is in the predetermined condition on the basis of the determination value. In the present embodiment, the predetermined condition is particularly a condition in which the angle sensor 1 has not failed. The condition determination apparatus 4 thus detects a failure of the angle sensor 1. Hereinafter, the condition in which the angle sensor 1 has not failed will be referred to as normal condition.

The angle detection unit 3 includes a conversion processing unit 31, a common correction processing unit 32, a non-common correction processing unit 33, and an angle operation unit 34. The conversion processing unit 31 performs conversion processing for converting the plurality of detection signals into a plurality of uncorrected signals each containing a reduced error component relative to the error component contained in each of the plurality of detection signals. The common correction processing unit 32 performs common correction processing for converting the plurality of uncorrected signals, which have correspondence with the plurality of detection signals, into a plurality of common corrected signals to be used for the generation of the detected angle value θs and the generation of the determination value. The non-common correction processing unit 33 performs non-common correction processing for converting the plurality of common corrected signals into a first angle operation signal SC and a second angle operation signal SD which are used for an operation for generating the detected angle value θs and not used for the generation of the determination value. The angle operation unit 34 calculates the detected angle value θs by using the first and second angle operation signals SC and SD.

The determination value generation unit 41 generates the determination value on the basis of the plurality of common corrected signals. The common correction processing is processing for converting the plurality of uncorrected signals into the plurality of common corrected signals so that the angular error occurring in the detected angle value θs is reduced relative to the case where the detected angle value θs is generated using the plurality of uncorrected signals without the application of the common correction processing, and so that the range over which the determination value varies depending on the angle θ to be detected is narrower than in the case where the determination value is generated using the plurality of uncorrected signals without the application of the common correction processing.

In the present embodiment, the plurality of detection signals are the first, the second, and the third detection signal S11, S12 and S13. The angle detection unit 3 further includes input ports P10, P20 and P30 for receiving the detection signals S11, S12 and S13, respectively.

In the present embodiment, the plurality of uncorrected signals are a first uncorrected signal S1 and a second uncorrected signal S2. The conversion processing unit 31 includes two operation units 31A and 31B. The operation unit 31A generates the first uncorrected signal S1 by performing an operation to obtain the sum of the first detection signal S11 and the second detection signal S12 received at the input ports P10 and P20, respectively. The operation unit 31B generates the second uncorrected signal S2 by performing an operation to obtain the sum of the third detection signal S13 and the second detection signal S12 received at the input ports P30 and P20, respectively. When the angle θ to be detected varies with the predetermined period T, each of the first and second uncorrected signals S1 and S2 contains an ideal component which varies periodically in such a manner as to trance an ideal sinusoidal curve.

Now, a specific description will be given of the conversion processing at the conversion processing unit 31. Suppose here that each of the first to third detection signals S11, S12 and S13 contains the ideal component and an error component corresponding to the third harmonic of the ideal component. First, we let the ideal component of the second detection signal S12 be cos θ. In this case, the error component of the second detection signal S12 can be expressed as $a_1 \cdot \cos 3\theta$. The first to third detection signals S11, S12 and S13 are expressible by the following Eqs. (1), (2) and (3), respectively. The center value of each of the first to third detection signals S11, S12 and S13 is taken as 0.

$$S11 = \cos(\theta - 60°) + a_1 \cdot \cos\{3(\theta - 60°)\} \quad (1)$$
$$= \cos(\theta - 60°) - a_1 \cdot \cos 3\theta$$

$$S12 = \cos\theta + a_1 \cdot \cos 3\theta \quad (2)$$

$$S13 = \cos(\theta + 60°) + a_1 \cdot \cos\{3(\theta + 60°)\} \quad (3)$$
$$= \cos(\theta + 60°) - a_1 \cdot \cos 3\theta$$

The first and second uncorrected signals S1 and S2 are respectively expressible by the following Eqs. (4) and (5) using the first to third detection signals S11, S12 and S13 expressed by Eqs. (1) to (3).

$$S1 = S11 + S12 \quad (4)$$
$$= \cos(\theta - 60°) - a_1 \cdot \cos 3\theta + \cos\theta + a_1 \cdot \cos 3\theta$$
$$= 2\cos(\theta - 30°) \cdot \cos(-30°)$$
$$= 1.73\cos(\theta - 30°)$$

$$S2 = S13 + S12 \quad (5)$$
$$= \cos(\theta + 60°) - a_1 \cdot \cos 3\theta + \cos\theta + a_1 \cdot \cos 3\theta$$
$$= 2\cos(\theta + 30°) \cdot \cos(30°)$$
$$= 1.73\cos(\theta + 30°)$$

As indicated by Eq. (4), the error component of the first detection signal S11 and the error component of the second detection signal S12 cancel each other out when the first uncorrected signal S1 is generated. As a result, the first uncorrected signal S1 contains a reduced error component relative to that contained in each of the first and second detection signals S11 and S12. As indicated in Eq. (5), the error component of the second detection signal S12 and the error component of the third detection signal S13 cancel each other out when the second uncorrected signal S2 is generated. As a result, the second uncorrected signal S2 contains a reduced error component relative to that contained in each of the second and third detection signals S12 and S13.

Figure 5:
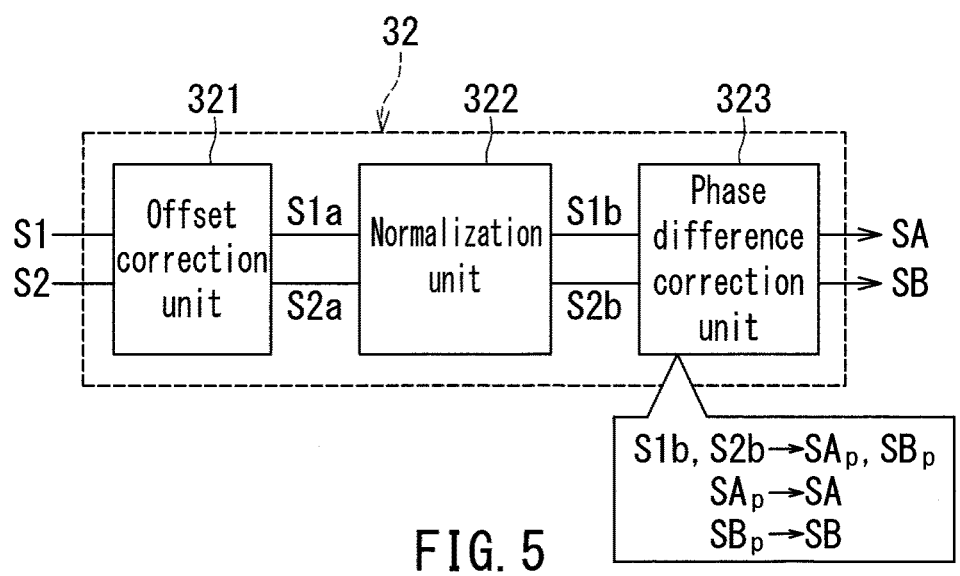
FIG. 5 is a functional block diagram illustrating the configuration of a common correction processing unit of the angle detection unit of the first embodiment of the invention.

Reference is now made to FIG. 5 to describe the configuration and operation of the common correction processing unit 32 and the details of the common correction processing. FIG. 5 is a functional block diagram illustrating the configuration of the common correction processing unit 32. In the present embodiment, the plurality of common corrected signals are a first common corrected signal SA and a second common corrected signal SB. When the angle θ to be detected varies with the predetermined period T, each of the first and second common corrected signals SA and SB contains an ideal component which varies periodically in such a manner as to trace an ideal sinusoidal curve. The ideal component of the first common corrected signal SA and the ideal component of the second common corrected signal SB have a phase difference of 90°. The common correction processing in the present embodiment is processing for converting the first and second uncorrected signals S1 and S2 into the above-described first and second common corrected signals SA and SB, respectively.

As shown in FIG. 5, the common correction processing unit 32 includes an offset correction unit 321, a normalization unit 322, and a phase difference correction unit 323. The offset correction unit 321 performs processing for correcting offsets of the first and second uncorrected signals S1 and S2 to generate signals S1$a$ and S2$a$. This processing will be referred to as offset correction processing. The signals S1$a$ and S2$a$ are determined by the following Eqs. (6) and (7), respectively.

$$S1a = S1 - (S1_{max} + S1_{min})/2 \quad (6)$$

$$S2a = S2 - (S2_{max} + S2_{min})/2 \quad (7)$$

In Eq. (6), $S1_{max}$ and $S1_{min}$ represent the maximum value and the minimum value of the first uncorrected signal S1, respectively. In Eq. (7), $S2_{max}$ and $S2_{min}$ represent the maximum value and the minimum value of the second uncorrected signal S2, respectively. The maximum value $S1_{max}$ and the minimum value $S1_{min}$ are determined from the waveform for at least one period of the first uncorrected signal S1. The maximum value $S2_{max}$ and the minimum value $S2_{min}$ are determined from the waveform for at least one period of the second uncorrected signal S2. The waveforms for at least one period of the first and second uncorrected signals S1 and S2 can be generated before shipment or use of the angle sensor 1.

The normalization unit 322 performs processing for normalizing the amplitudes of the first and second uncorrected signals S1 and S2 to generate signals S1$b$ and S2$b$. This processing will be referred to as normalization processing. The normalization processing is performed using the signals S1$a$ and S2$a$. The signals S1$b$ and S2$b$ are determined by the following Eqs. (8) and (9), respectively.

$$S1b = S1a/S1_{amp} \quad (8)$$

$$S2b = S2a/S2_{amp} \quad (9)$$

In Eq. (8), $S1_{amp}$ represents the amplitude of the first uncorrected signal S1. In Eq. (9), $S2_{amp}$ represents the amplitude of the second uncorrected signal S2. The amplitude $S1_{amp}$ can be determined from the waveform for at least one period of the first uncorrected signal S1. The amplitude $S2_{amp}$ can be determined from the waveform for at least one period of the second uncorrected signal S2.

The phase difference correction unit 323 performs processing for making a phase difference between the ideal components of the first and second common corrected signals SA and SB be 90° irrespective of a phase difference between the ideal components of the first and second uncorrected signals S1 and S2, and making the first and second common corrected signals SA and SB be of the same amplitude. This processing will be referred to as phase difference correction processing. Specifically, the phase difference correction unit 323 first generates signals SAp and SBp using the following Eqs. (10) and (11).

$$SAp = S1b + S2b \quad (10)$$

$$SBp = S1b - S2b \quad (11)$$

The phase difference correction unit 323 then normalizes the amplitudes of the signals SAp and SBp using the following Eqs. (12) and (13). This normalization makes the signals SAp and SBp into the first and second common corrected signals SA and SB, respectively.

$$SA = SAp/SAp_{amp} \quad (12)$$

$$SB = SBp/SBp_{amp} \quad (13)$$

In Eq. (12), $SAp_{amp}$ represents the amplitude of the signal SAp. In Eq. (13), $SBp_{amp}$ represents the amplitude of the signal SBp. The amplitude $SAp_{amp}$ can be determined from the waveform for at least one period of the signal SAp. The amplitude $SBp_{amp}$ can be determined from the waveform for at least one period of the signal SBp. The waveforms for at least one period of the signals SAp and SBp can be generated before shipment or use of the angle sensor 1.

As described previously, if the ideal component of the second detection signal S12 is cos θ, then the ideal component of the first common corrected signal SA is cos θ, and the ideal component of the second common corrected signal SB is sin θ.

Figure 6:
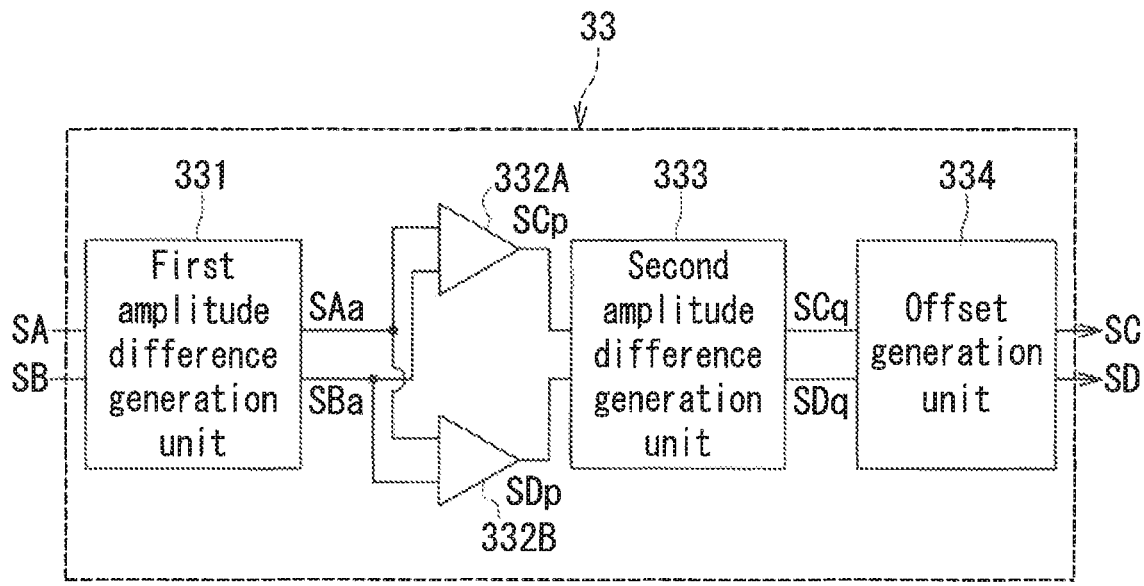
FIG. 6 is a functional block diagram illustrating the configuration of a non-common correction processing unit of the angle detection unit of the first embodiment of the invention.

Reference is now made to FIG. 6 to describe the configuration and operation of the non-common correction processing unit 33 and the details of the non-common correction processing. FIG. 6 is a functional block diagram illustrating the configuration of the non-common correction processing unit 33. The non-common correction processing in the present embodiment is processing for reducing the angular error occurring in the detected angle value θs relative to the case where the detected angle value θs is generated using the first and second common corrected signals SA and SB without the application of the non-common correction processing. The angular error to be reduced by the non-common correction processing contains at least one of a first angular error component and a second angular error component. When the angle θ to be detected varies with the predetermined period T, the first angular error component varies with a period equal to the predetermined period T, and the second angular error component varies with a period of ½ the predetermined period T.

As shown in FIG. 6, the non-common correction processing unit 33 includes a first amplitude difference generation unit 331, operation units 332A and 332B, a second amplitude difference generation unit 333, and an offset generation unit 334. The first amplitude difference generation unit 331 adjusts the amplitudes of the first and second common corrected signals SA and SB to generate signals SAa and SBa. The signals SAa and SBa are determined by the following Eqs. (14) and (15), respectively.

$$SAa = SA/(1 - C1) \quad (14)$$

$$SBa = SB/(1 + C1) \quad (15)$$

Each of Eqs. (14) and (15) contains a correction parameter C1. The correction parameter C1 is at or near 0. When the correction parameter C1 is 0, the signals SAa and SBa are of the same amplitude. When the correction parameter C1 is other than 0, the signals SAa and SBa have different amplitudes. The correction parameter C1 is expressed by the following Eq. (16), for example.

$$C1 = \beta \cdot \sin(s) \quad (16)$$

A description concerning β and s in Eq. (16) will be given later.

The operation units 332A and 332B generate signals SCp and SDp using the following Eqs. (17) and (18), respectively.

$$SCp = SAa - SBa \qquad (17)$$

$$SDp = SAa + SBa \qquad (18)$$

The second amplitude difference generation unit 333 adjusts the amplitudes of the signals SCp and SDp to generate signals SCq and SDq. The signals SCq and SDq are determined by the following Eqs. (19) and (20), respectively.

$$SCq = SCp/\{SCp_{amp} \cdot (1-C2)\} \qquad (19)$$

$$SDq = SDp/\{SDp_{amp} \cdot (1+C2)\} \qquad (20)$$

In Eq. (19), $SCp_{amp}$ represents the amplitude of the signal SCp. In Eq. (20), $SDp_{amp}$ represents the amplitude of the signal SDp. The amplitude $SCp_{amp}$ can be determined from the waveform for at least one period of the signal SCp. The amplitude $SDp_{amp}$ can be determined from the waveform for at least one period of the signal SDp. The waveforms for at least one period of the signals SCp and SDp can be generated before shipment or use of the angle sensor 1.

Each of Eqs. (19) and (20) contains a correction parameter C2. The correction parameter C2 is at or near 0.

When both of the correction parameters C1 and C2 are 0, Eqs. (17) to (20) represent fundamental operations for making the signals SCq and SDq have a phase difference of 90° and have the same amplitude. When the correction parameter C1 is other than 0, the phase difference between the signals SCq and SDq becomes near 90°, although not exactly 90°. When the correction parameter C2 is other than 0, the signals SCq and SDq have different amplitudes.

The correction parameter C2 is expressed by the following Eq. (21), for example.

$$C2 = \beta \cdot \cos(s) \qquad (21)$$

$\beta$ and s in Eq. (21) are the same as those in Eq. (16).

The offset generation unit 334 adjusts the offsets of the signals SCp and SDp to generate the first and second angle operation signals SC and SD. The first and second angle operation signals SC and SD are determined by the following Eqs. (22) and (23), respectively.

$$SC = SCq + C3 \qquad (22)$$

$$SD = SDq - C4 \qquad (23)$$

Eq. (22) contains a correction parameter C3. Eq. (23) contains a correction parameter C4. Each of the correction parameters C3 and C4 is at or near 0. When the correction parameter C3 is 0, no offset occurs in the first angle operation signal SC. When the correction parameter C3 is other than 0, an offset occurs in the first angle operation signal SC. When the correction parameter C4 is 0, no offset occurs in the second angle operation signal SD. When the correction parameter C4 is other than 0, an offset occurs in the second angle operation signal SD. The correction parameters C3 and C4 are respectively expressed by the following Eqs. (24) and (25), for example.

$$C3 = SCq_{amp} \cdot \alpha \cdot \sin(t) \qquad (24)$$

$$C4 = SDq_{amp} \cdot \alpha \cdot \cos(t) \qquad (25)$$

In Eq. (24), $SCq_{amp}$ represents the amplitude of the signal SCq. In Eq. (25), $SDq_{amp}$ represents the amplitude of the signal SDq. The amplitude $SCq_{amp}$ can be determined from the waveform for at least one period of the signal SCq. The amplitude $SDq_{amp}$ can be determined from the waveform for at least one period of the signal SDq. The waveforms for at least one period of the signals SCq and SDq can be generated before shipment or use of the angle sensor 1.

A description concerning a and t in Eqs. (24) and (25) will be given later.

Now, angle operation at the angle operation unit 34 will be described. The angle operation unit 34 calculates the detected angle value θs using the first and second angle operation signals SC and SD generated by the non-common correction processing unit 33. More specifically, for example, the angle operation unit 34 calculates θs using the following Eq. (26). Note that "a tan" in Eq. (26) represents arctangent.

$$\theta s = a\,\tan(SD/SC) - \varphi \qquad (26)$$

In Eq. (26), $\varphi$ represents the phase difference between an angle calculated from a tan(SD/SC) and the detected angle value θs. As described previously, if the ideal component of the second detection signal S12 is cos θ, then $\varphi$ is 45°, for example.

If θs is in the range of 0° to less than 360°, θs in Eq. (26) has two solutions 180° different in value. Which of the two solutions of θs in Eq. (26) is the true value of θs can be determined from the combination of positive and negative signs of SC and SD. The angle operation unit 34 determines θs within the range of 0° to less than 360° on the basis of Eq. (26) and the foregoing determination on the combination of positive and negative signs of SC and SD.

Next, a description will be given of the relationship between the first and second angular error components and the correction parameters C1 to C4. As described previously, when the angle θ to be detected varies with the predetermined period T, the first angular error component varies with a period equal to the predetermined period T, and the second angular error component varies with a period of ½ the predetermined period T. The first angular error component will be defined as $\alpha \cdot \cos(\theta - t)$, and the second angular error component as $\beta \cdot \cos\{2(\theta - s/2)\}$, where a corresponds to the amplitude of the first angular error component, t corresponds to the phase of the first angular error component, β corresponds to the amplitude of the second angular error component, and s corresponds to the phase of the second angular error component. The values of α and β are zero or more. To obtain α, t, β, and s, for example, the waveform of the angular error of the detected angle value θs is acquired over at least one period, and the Fourier transform is applied to the waveform of the angular error.

The first angular error component contains a first component and a second component. The first component and the second component differ in phase by 90°. The amplitude of the first component is $\alpha \cdot \sin(t)$, and the amplitude of the second component is $\alpha \cdot \cos(t)$. The amplitude of the first component varies depending on the value of the correction parameter C3. Thus, it is possible to reduce the first component by adjusting the value of the correction parameter C3 in accordance with the amplitude of the first component. To be more specific, the first component can be reduced by, as shown by Eq. (24), using the product of the amplitude $\alpha \cdot \sin(t)$ of the first component and the amplitude $SCq_{amp}$ of the signal SCq as the correction parameter C3.

The amplitude of the second component varies depending on the value of the correction parameter C4. Thus, it is possible to reduce the second component by adjusting the value of the correction parameter C4 in accordance with the amplitude of the second component. To be more specific, the second component can be reduced by, as shown by Eq. (25), using the product of the amplitude α·cos(t) of the second component and the amplitude $SDq_{amp}$ of the signal SDq as the correction parameter C4.

If the first angular error component is sufficiently low, the correction parameters C3 and C4 may each be set at 0.

The second angular error component contains a third component and a fourth component. The third component and the fourth component differ in phase by 45°. The amplitude of the third component is β·sin(s), and the amplitude of the fourth component is β·cos(s). The amplitude of the third component varies depending on the value of the correction parameter C1. Thus, it is possible to reduce the third component by adjusting the value of the correction parameter C1 in accordance with the amplitude of the third component. To be more specific, the third component can be reduced by, as shown by Eq. (16), using the amplitude β·sin(s) of the third component as the correction parameter C1.

The amplitude of the fourth component varies depending on the value of the correction parameter C2. Thus, it is possible to reduce the fourth component by adjusting the value of the correction parameter C2 in accordance with the amplitude of the fourth component. To be more specific, the fourth component can be reduced by, as shown by Eq. (21), using the amplitude β·cos(s) of the fourth component as the correction parameter C2.

If the second angular error component is sufficiently low, the correction parameters C1 and C2 may each be set at 0.

The operation of the condition determination apparatus 4 will now be described with reference to FIG. 4. The determination value generation unit 41 generates the determination value dLr on the basis of the first and second common corrected signals SA and SB. In the present embodiment, the determination value generation unit 41 performs an operation including determining the sum of the square of the first common corrected signal SA and the square of the second common corrected signal SB to generate the determination value dLr. The "operation including determining the sum of the square of the first common corrected signal SA and the square of the second common corrected signal SB" includes multiplying the determined sum by a predetermined coefficient or adding/subtracting a predetermined value to/from the determined sum.

The operation for generating the determination value dLr will be described below in the concrete. First, the determination value generation unit 41 generates an initial determination value Lr by performing an operation expressed by the following Eq. (27).

$$Lr = SA^2 + SB^2 \quad (27)$$

The determination value generation unit 41 then generates the determination value dLr by performing an operation expressed by the following Eq. (28)

$$dLr = Lr - Lrav \quad (28)$$

Lrav in Eq. (28) represents an average of the initial determination value Lr when the angle sensor 1 is in the normal condition and the angle θ to be detected varies from 0° to 360°. The average Lrav is determined, for example, according to the result of a measurement of the initial determination value Lr performed before shipment of the non-failed angle sensor 1.

If each of the first and second common corrected signals SA and SB is composed only of the ideal component and the angle sensor 1 has not failed, the determination value dLr is composed only of an ideal value component. The ideal value component is of a constant value, which specifically is 0, regardless of the angle θ to be detected.

In the cases other than when each of the first and second common corrected signals SA and SB is composed only of the ideal component and the angle sensor 1 has not failed, the determination value dLr may differ from the value of the ideal value component. If the determination value dLr differs from the value of the ideal value component, the determination value dLr can vary depending on the angle θ to be detected.

The determination unit 42 determines whether the angle sensor 1 is in the predetermined condition on the basis of the determination value dLr. More specifically, the determination unit 42 determines that the angle sensor 1 is in the normal condition if the determination value dLr falls within a predetermined determination range. In other cases, the determination unit 42 determines that the angle sensor 1 has failed. The determination unit 42 outputs a signal indicating the determination result. The determination range extends from −LTH to LTH, with LTH as a predetermined positive value. The determination range is set before shipment of the non-failed angle sensor 1.

As has been described, according to the present embodiment, the first and second uncorrected signals S1 and S2, which have correspondence with the first to third detection signals S11, S12 and S13, are converted into the first and second common corrected signals SA and SB by the common correction processing at the common correction processing unit 32. Then, the detected angle value θs and the determination value dLr are generated by using the first and second common corrected signals SA and SB. In the present embodiment, in particular, the common correction processing includes the offset correction processing, the normalization processing, and the phase difference correction processing. The present embodiment thus enables reducing the angular error in the normal condition and narrowing the range over which the determination value dLr varies depending on the angle θ to be detected, when compared with the case where at least one of the center value, the amplitude and the phase of at least one of the first and second uncorrected signals S1 and S2 deviates from its desired value. This enables accurate determination of the condition of the angle sensor 1. Hereinafter, the range over which the determination value dLr varies depending on the angle θ to be detected will be referred to as the variation range of the determination value dLr.

Further, according to the present embodiment, the conversion processing at the conversion processing unit 31 converts the first to third detection signals S11, S12 and S13 into the first and second uncorrected signals S1 and S2 which contain reduced error components relative to those contained in the first to third detection signals S11, S12 and S13. This also contributes to the reduction of the angular error in the normal condition and narrowing of the variation range of the determination value dLr.

The present embodiment achieves reduction of the angular error and narrowing of the variation range of the determination value dLr at the same time by the common correction processing performed by the single common correction processing unit 32. The present embodiment thus allows the configuration of the angle sensor 1 to be simpler than in the case where processing for reducing the angular error and processing for narrowing the variation range of the determination value dLr are performed separately.

Further, in the present embodiment, the angle detection unit 3 includes the non-common correction processing unit 33. The non-common correction unit 33 converts the first and second common corrected signals SA and SB into the first and second angle operation signals SC and SD, respectively. The first and second common corrected signals SA and SB are two signals the ideal components of which have a phase difference of 90° and the amplitudes of which are equal to each other. In contrast, the first and second angle operation signals SC and SD are not always such two signals, depending on the values of the correction parameters C1 to C4. Thus, if the determination value dLr is generated using the first and second angle operation signals SC and SD, the variation range of the determination value dLr may become larger than in the case where the determination value dLr is generated using the first and second common corrected signals SA and SB. In the present embodiment, the first and second angle operation signals SC and SD are used for the generation of the detected angle value θs, and not used for the generation of the determination value dLr. The present embodiment thereby enables further reduction of the angular error while narrowing the variation range of the determination value dLr.

Second Embodiment

A second embodiment of the invention will now be described. The angle sensor 1 according to the second embodiment includes a detection signal generation unit 102 and an angle detection unit 103, in place of the detection signal generation unit 2 and the angle detection unit 3 of the first embodiment.

Figure 8:
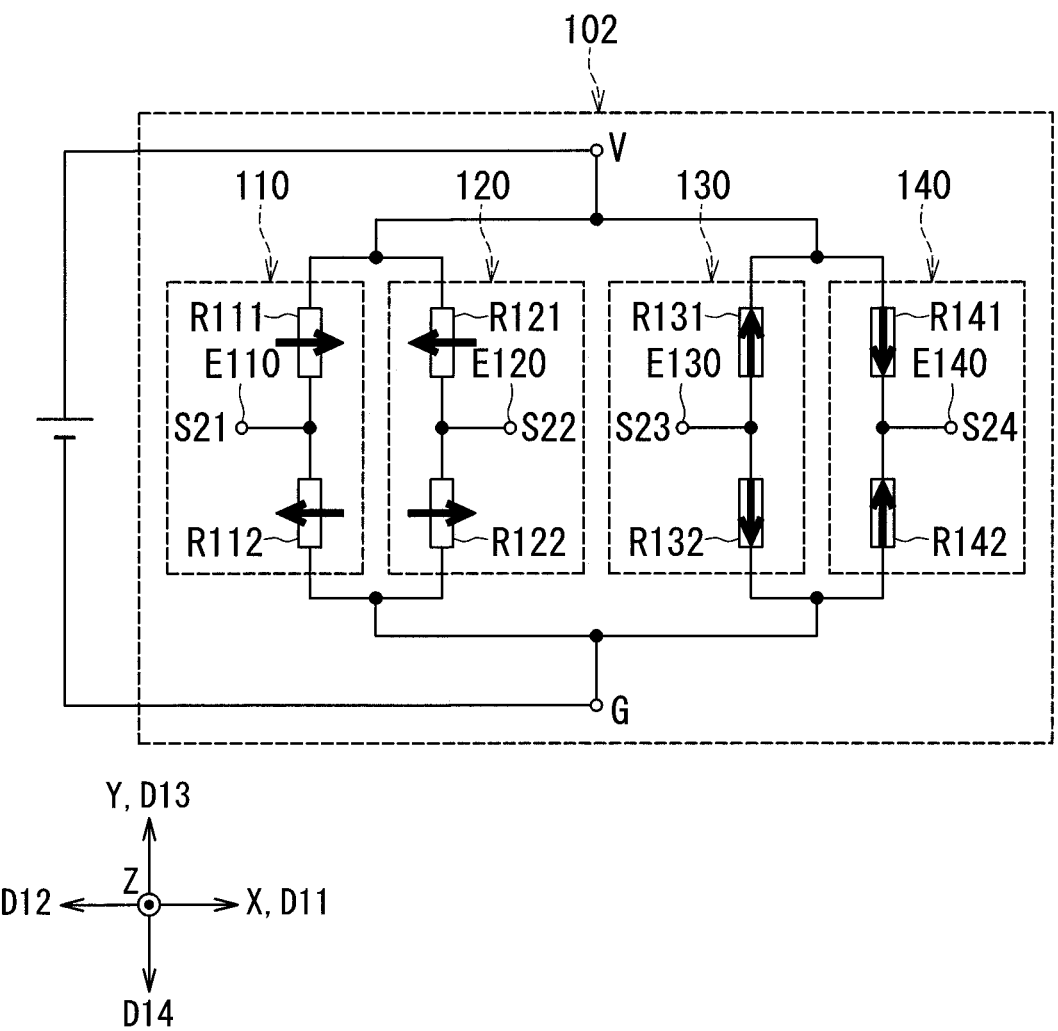
FIG. 8 is a circuit diagram illustrating the configuration of a detection signal generation unit of an angle sensor according to a second embodiment of the invention.

First, the detection signal generation unit 102 will be described with reference to FIG. 8. FIG. 8 is a circuit diagram illustrating the configuration of the detection signal generation unit 102. The detection signal generation unit 102 generates a first, a second, a third and a fourth detection signal S21, S22, S23 and S24 each having a correspondence with the angle θ to be detected. The detection signal generation unit 102 includes a first detection circuit 110 for generating the first detection signal S21, a second detection circuit 120 for generating the second detection signal S22, a third detection circuit 130 for generating the third detection signal S23, and a fourth detection circuit S140 for generating the fourth detection signal S24. Each of the first to fourth detection circuits 110, 120, 130 and 140 includes at least one magnetic detection element for detecting a rotating magnetic field MF. The detection signal generation unit 102 further includes a power supply port V and a ground port G. A power supply voltage of predetermined magnitude, such as 5 volts, is applied between the power supply port V and the ground port G.

As the direction DM of the rotating magnetic field MF rotates with a predetermined period T, the angle θ to be detected varies with the predetermined period T. In such a case, all the first to fourth detection signals S21, S22, S23 and S24 vary periodically with a signal period equal to the predetermined period T. The first to fourth detection signals S21, S22, S23 and S24 are different in phase from each other.

The first detection circuit 110 includes a pair of serially connected magnetic detection elements R111 and R112, and an output port E110. One end of the magnetic detection element R111 is connected to the power supply port V. The other end of the magnetic detection element R111 is connected to one end of the magnetic detection element R112 and the output port E110. The other end of the magnetic detection element R112 is connected to the ground port G. The output port E110 outputs the first detection signal S21 which corresponds to the potential at the connection point between the magnetic detection elements R111 and R112.

The second detection circuit 120 includes a pair of serially connected magnetic detection elements R121 and R122, and an output port E120. One end of the magnetic detection element R121 is connected to the power supply port V. The other end of the magnetic detection element R121 is connected to one end of the magnetic detection element R122 and the output port E120. The other end of the magnetic detection element R122 is connected to the ground port G. The output port E120 outputs the second detection signal S22 which corresponds to the potential at the connection point between the magnetic detection elements R121 and R122.

The third detection circuit 130 includes a pair of serially connected magnetic detection elements R131 and R132, and an output port E130. One end of the magnetic detection element R131 is connected to the power supply port V. The other end of the magnetic detection element R131 is connected to one end of the magnetic detection element R132 and the output port E130. The other end of the magnetic detection element R132 is connected to the ground port G. The output port E130 outputs the third detection signal S23 which corresponds to the potential at the connection point between the magnetic detection elements R131 and R132.

The fourth detection circuit 140 includes a pair of serially connected magnetic detection elements R141 and R142, and an output port E140. One end of the magnetic detection element R141 is connected to the power supply port V. The other end of the magnetic detection element R141 is connected to one end of the magnetic detection element R142 and the output port E140. The other end of the magnetic detection element R142 is connected to the ground port G. The output port E140 outputs the fourth detection signal S24 which corresponds to the potential at the connection point between the magnetic detection elements R141 and R142.

The magnetic detection elements R111, R112, R121, R122, R131, R132, R141 and R142 are configured in the same manner as the magnetic detection elements R11, R12, R21, R22, R31 and R32 of the first embodiment except for the magnetization directions of the magnetization pinned layers.

In the first detection circuit 110, the magnetization pinned layers of the MR elements included in the magnetic detection element R111 are magnetized in the X direction. This magnetization direction will hereinafter be referred to as the first direction D11. The magnetization pinned layers of the MR elements included in the magnetic detection element R112 are magnetized in the opposite direction to the first direction D11, that is, in the −X direction. In the first detection circuit 110, the potential at the connection point between the magnetic detection elements R111 and R112 varies depending on the strength of a component in the first direction D11 of the rotating magnetic field MF. Thus, the first detection circuit 110 detects the strength of the component in the first direction D11 of the rotating magnetic field MF and outputs a signal indicative of the strength as the first detection signal S21. The strength of the component in the first direction D11 of the rotating magnetic field MF has a correspondence with the angle θ to be detected.

In the second detection circuit 120, the magnetization pinned layers of the MR elements included in the magnetic detection element R121 are magnetized in the −X direction. This magnetization direction will hereinafter be referred to as the second direction D12. The magnetization pinned layers of the MR elements included in the magnetic detection element R122 are magnetized in the opposite direction to the second direction D12, that is, in the X direction. In the second detection circuit 120, the potential at the connection point between the magnetic detection elements R121 and R122 varies depending on the strength of a component in the second direction D12 of the rotating magnetic field MF. Thus, the second detection circuit 120 detects the strength of the component in the second direction D12 of the rotating magnetic field MF and outputs a signal indicative of the strength as the second detection signal S22. The strength of the component in the second direction D12 of the rotating magnetic field MF has a correspondence with the angle θ to be detected.

In the third detection circuit 130, the magnetization pinned layers of the MR elements included in the magnetic detection element R131 are magnetized in the Y direction. This magnetization direction will hereinafter be referred to as the third direction D13. The magnetization pinned layers of the MR elements included in the magnetic detection element R132 are magnetized in the opposite direction to the third direction D13, that is, in the −Y direction. In the third detection circuit 130, the potential at the connection point between the magnetic detection elements R131 and R132 varies depending on the strength of a component in the third direction D13 of the rotating magnetic field MF. Thus, the third detection circuit 130 detects the strength of the component in the third direction D13 of the rotating magnetic field MF and outputs a signal indicative of the strength as the third detection signal S23. The strength of the component in the third direction D13 of the rotating magnetic field MF has a correspondence with the angle θ to be detected.

In the fourth detection circuit 140, the magnetization pinned layers of the MR elements included in the magnetic detection element R141 are magnetized in the −Y direction. This magnetization direction will hereinafter be referred to as the fourth direction D14. The magnetization pinned layers of the MR elements included in the magnetic detection element R142 are magnetized in the opposite direction to the fourth direction D14, that is, in the Y direction. In the fourth detection circuit 140, the potential at the connection point between the magnetic detection elements R141 and R142 varies depending on the strength of a component in the fourth direction D14 of the rotating magnetic field MF. Thus, the fourth detection circuit 140 detects the strength of the component in the fourth direction D14 of the rotating magnetic field MF and outputs a signal indicative of the strength as the fourth detection signal S24. The strength of the component in the fourth direction D14 of the rotating magnetic field MF has a correspondence with the angle θ to be detected.

In the light of the production accuracy of the MR elements or other factors, the magnetization directions of the magnetization pinned layers of the plurality of MR elements in the detection circuits 110, 120, 130 and 140 may be slightly different from those described above.

When the angle θ to be detected varies with the predetermined period T, each of the detection signals S21, S22, S23 and S24 contains an ideal component and an error component. The ideal components of the detection signals S21, S22, S23 and S24 are different in phase from each other and have a predetermined phase relationship with each other. In the present embodiment, in particular, the ideal components of the detection signals S21 and S22 are different in phase from each other by 180°. The ideal components of the detection signals S21 and S23 are different in phase from each other by 90°. The ideal components of the detection signals S23 and S24 are different in phase from each other by 180°.

Figure 9:
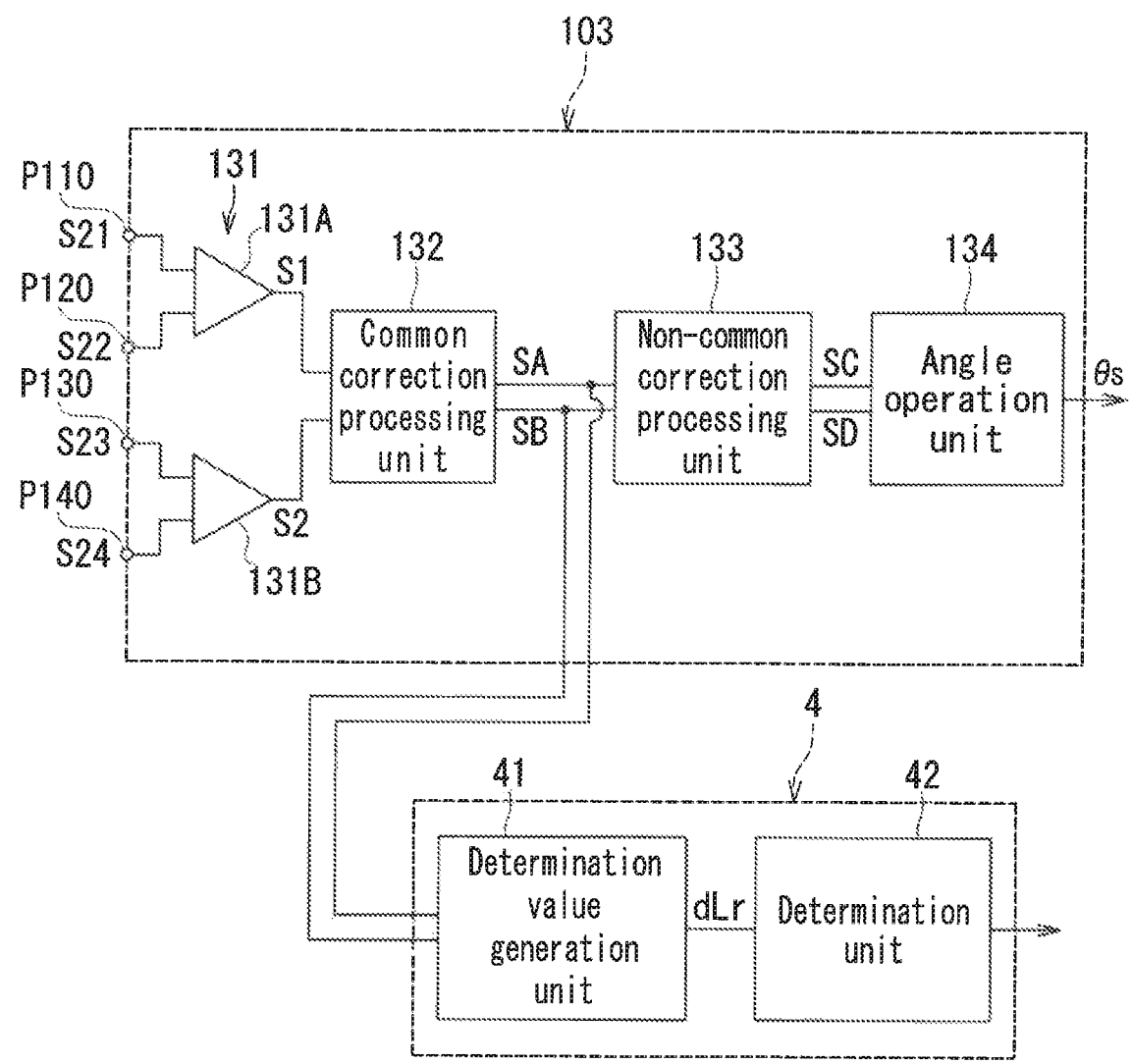
FIG. 9 is a functional block diagram illustrating the configuration of an angle detection unit and a condition determination apparatus of the angle sensor according to the second embodiment of the invention.

Reference is now made to FIG. 9 to describe the angle detection unit 103. FIG. 9 is a functional block diagram illustrating the configuration of the angle detection unit 103 and the condition determination apparatus 4. The angle detection unit 103 generates the detected angle value θs on the basis of the first to fourth detection signals S21, S22, S23 and S24 generated by the detection signal generation unit 102. The detected angle value θs has a correspondence with the angle θ to be detected. The condition determination apparatus 4 is configured and operates in the same manner as in the first embodiment. The angle detection unit 103 and the condition determination apparatus 4 can be implemented by an application-specific integrated circuit (ASIC) or a microcomputer, for example.

The angle detection unit 103 includes input ports P110, P120, P130 and P140, a conversion processing unit 131, a common correction processing unit 132, a non-common correction processing unit 133, and an angle operation unit 134. The first to fourth detection signals S21, S22, S23 and S24 are received at the input ports P110, P120, P130 and P140, respectively.

The conversion processing unit 131 includes two operation units 131A and 131B. The operation unit 131A generates the first uncorrected signal S1 by performing an operation to obtain the difference between the first detection signal S21 and the second detection signal S22 received at the input ports P110 and P120, respectively. The operation unit 131B generates the second uncorrected signal S2 by performing an operation to obtain the difference between the third detection signal S23 and the fourth detection signal S24 received at the input ports P130 and P140, respectively. The first and second uncorrected signals S1 and S2 are determined by the following Eqs. (29) and (30), respectively.

$$S1 = S21 - S22 \tag{29}$$

$$S2 = S23 - S24 \tag{30}$$

When each of the detection signals S21, S22, S23 and S24 contains an error component corresponding to the third harmonic of the ideal component, the operations expressed by Eqs. (29) and (30) cannot cancel out the error components of the detection signals S21, S22, S23, and S24. In the present embodiment, when the angle θ to be detected varies with a predetermined period T, each of the first and second uncorrected signals S1 and S2 contains not only the ideal component but also an error component corresponding to the third harmonic of the ideal component.

The common correction processing unit 132 performs common correction processing for converting the first and second uncorrected signals S1 and S2, which have correspondence with the first to fourth detection signals S21, S22, S23 and S24, into the first and second common corrected signals SA and SB to be used for the generation of the detected angle value θs and the generation of the determination value dLr.

The non-common correction processing unit 133 and the angle operation unit 134 are configured and operate in the same manner as the non-common correction processing unit 33 and the angle operation unit 34 of the first embodiment. More specifically, the non-common correction processing unit 133 performs non-common correction processing for converting the first and second common corrected signals SA and SB into the first and second angle operation signals SC and SD which are used for the operation for generating the detected angle value θs and not used for the generation of the determination value dLr. The angle operation unit 134 calculates the detected angle value θs by using the first and second angle operation signals SC and SD.

Figure 10:
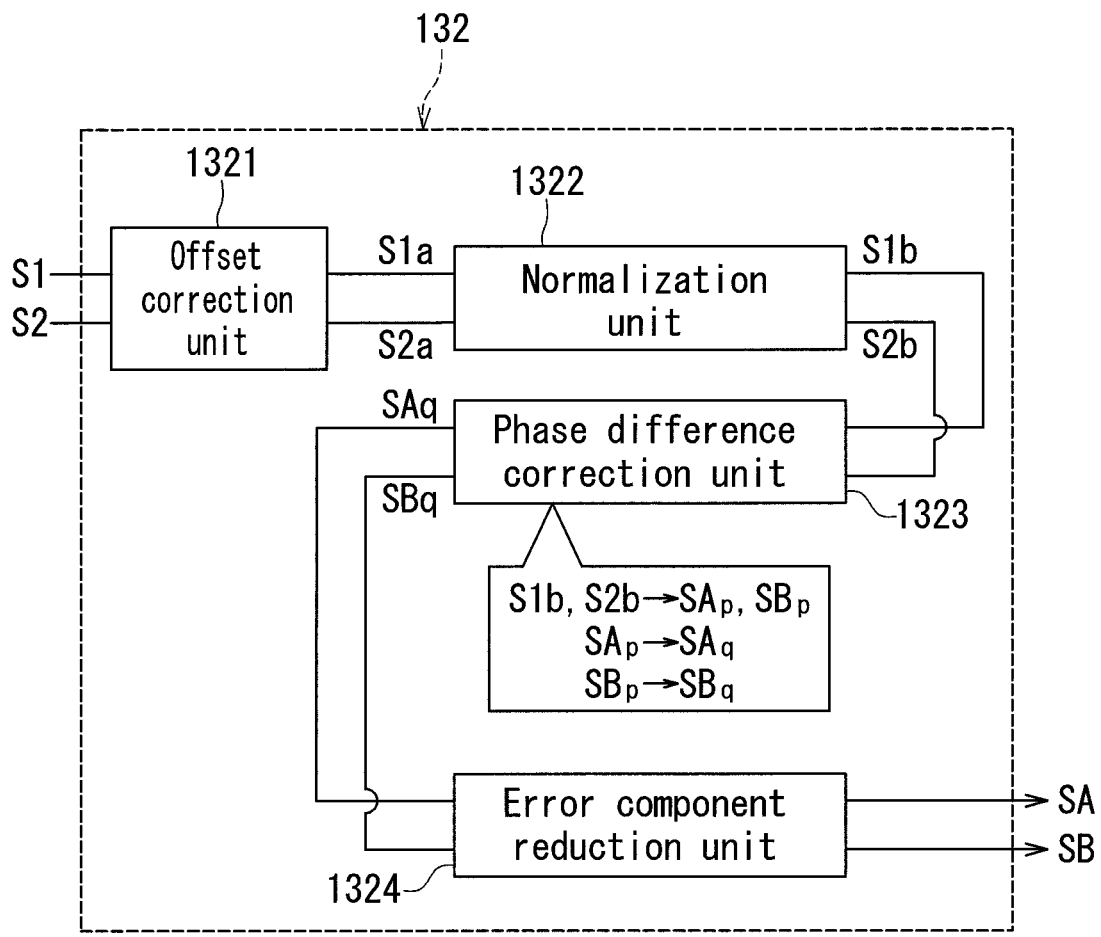
FIG. 10 is a functional block diagram illustrating the configuration of a common correction processing unit of the angle detection unit of the second embodiment of the invention.

Reference is now made to FIG. 10 to describe the configuration and operation of the common correction processing unit 132 and the details of the common correction processing in the present embodiment. FIG. 10 is a functional block diagram illustrating the configuration of the common correction processing unit 132. As shown in FIG. 10, the common correction processing unit 132 includes an offset correction unit 1321, a normalization unit 1322, a phase difference correction unit 1323, and an error component reduction unit 1324. The offset correction unit 1321 and the normalization unit 1322 operate in the same manner as the offset correction unit 321 and the normalization unit 322 of the first embodiment.

The phase difference correction unit 1323 performs phase difference correction processing. To be more specific, the phase difference correction unit 1323 first generates signals SAp and SBp by the following Eqs. (31) and (32) using the signals S1b and S2b generated by the normalization unit 1322.

$$SAp = S1b - S2b \tag{31}$$

$$SBp = S1b + S2b \tag{32}$$

The phase difference correction unit 1323 then normalizes the amplitudes of the signals SAp and SBp to generate signals SAq and SBq. The signals SAq and SBq are determined by the following Eqs. (33) and (34), respectively.

$$SAq = SAp / SAp_{max} \tag{33}$$

$$SBq = SBp / SBp_{max} \tag{34}$$

The error component reduction unit 1324 performs processing for causing each of the first and second common corrected signals SA and SB to contain a reduced error component relative to the error component contained in each of the first and second uncorrected signals S1 and S2. The error component reduction unit 1324 converts the signals SAq and SBq into the first and second common corrected signals SA and SB.

The error component reduction unit 1324 reduces an error component contained in each of the first and second uncorrected signals S1 and S2, the error component corresponding to the third harmonic of the ideal component and distorting the waveform of the first uncorrected signal S1 and the waveform of the second uncorrected signal S2 in a similar manner. This error component will be referred to as the first third-harmonic error component. The first third-harmonic error component causes an increase in the angular error and an increase in the variation range of the determination value dLr.

Here, we let the ideal component of the signal SAq be cos θ, and the ideal component of the signal SBq be sine. The signals SAq and SBq are expressible by the following Eqs. (35) and (36), respectively. In Eq. (35), "$A_1 \cdot \cos 3\theta$" is the first third-harmonic error component of the signal SAq. In Eq. (36), "$A_1 \cdot \sin(3\theta - 180°)$" is the first third-harmonic error component of the signal SBq.

$$SAq = \cos\theta + A_1 \cdot \cos 3\theta \tag{35}$$

$$SBq = \sin\theta + A_1 \cdot \sin(3\theta - 180°) \tag{36}$$

The error component reduction unit 1324 generates the first common corrected signal SA by subtracting an estimated value of the first third-harmonic error component of the signal SAq from the signal SAq. The error component reduction unit 1324 also generates the second common corrected signal SB by subtracting an estimated value of the first third-harmonic error component of the signal SBq from the signal SBq. The first and second common corrected signals SA and SB are determined by the following Eqs. (37) and (38), respectively.

$$SA = SAq - F_1 \cdot \cos 3\theta q \tag{37}$$

$$SB = SBq - F_1 \cdot \sin(3\theta q - 180°) \tag{38}$$

The value $F_1$ in Eqs. (37) and (38) can be obtained, for example, from the variation component of the sum of the square of the signal SAq and the square of the signal SBq. Hereinafter, the sum of the square of the signal SAq and the square of the signal SBq will be referred to as square-sum signal. The square-sum signal is expressible by the following Eq. (39) using the signals SAq and SBq expressed by Eqs. (35) and (36).

$$\begin{aligned} SAq^2 + SBq^2 &= (\cos\theta + A_1 \cdot \cos 3\theta)^2 + \\ &\quad \{\sin\theta + A_1 \cdot \sin(3\theta - 180°)\}^2 \\ &= \cos^2\theta + 2A_1 \cdot \cos\theta \cdot \cos 3\theta + A_1^2 \cdot \cos^2 3\theta + \\ &\quad \sin^2\theta - 2A_1 \cdot \sin\theta \cdot \sin 3\theta + A_1^2 \cdot \sin^2 3\theta \\ &= 1 + A_1^2 + A_1\{\cos(-2\theta) + \cos 4\theta\} - \\ &\quad A_1\{\cos(-2\theta) - \cos 4\theta\} \\ &= 1 + A_1^2 + 2A_1 \cdot \cos 4\theta \end{aligned} \tag{39}$$

According to Eq. (39), the variation component of the square-sum signal is "$2A_1 \cdot \cos 4\theta$". Thus, the value $A_1$ can be determined from the waveform of the square-sum signal corresponding to at least a quarter period of the angle θ to be detected. In the present embodiment, the value $A_1$ determined in this manner is taken as the value $F_1$. The waveform of the square-sum signal can be generated before shipment or use of the angle sensor 1.

θq in Eqs. (37) and (38) is calculated by the following Eq. (40) using the signals SAq and SBq.

$$\theta q = a\tan(SBq/SAq) \tag{40}$$

If θq is in the range of 0° to less than 360°, θq in Eq. (40) has two solutions 180° different in value. Which of the two solutions of θq in Eq. (40) is the true value of θq can be determined from the combination of positive and negative signs of SAq and SBq. The error component reduction unit 1324 determines θq within the range of 0° to less than 360° on the basis of Eq. (40) and the foregoing determination on the combination of positive and negative signs of SAq and SBq.

The error component reduction unit 1324 may determine θq from the signals SAq and SBq using Eq. (40) and then substitute θq into Eqs. (37) and (38) to generate the first and second common corrected signals SA and SB.

Alternatively, the error component reduction unit 1324 may generate the first and second common corrected signals SA and SB in the following manner, without determining θq. Rearranging Eqs. (37) and (38) yields the following Eqs. (41) and (42).

$$SA = SAq - F_1(4\cos^3\theta q - 3\cos\theta q) \tag{41}$$

$$SB = SBq - F_1(4\sin^3\theta q - 3\sin\theta q) \tag{42}$$

The error component reduction unit 1324 may replace cos θq in Eq. (41) with the signal SAq to generate the first common corrected signal SA, and may replace sin θq in Eq. (42) with the signal SBq to generate the second common corrected signal SB.

As has been described, according to the present embodiment, the error component reduction unit 1324 reduces the first third-harmonic error component in each of the first and second common corrected signals SA and SB relative to that contained in each of the first and second uncorrected signals S1 and S2. The present embodiment thus enables further reduction of the angular error in the normal condition and further narrowing of the variation range of the determination value dLr.

The other configuration, function and effects of the second embodiment are the same as those of the first embodiment.

Third Embodiment

Figure 11:
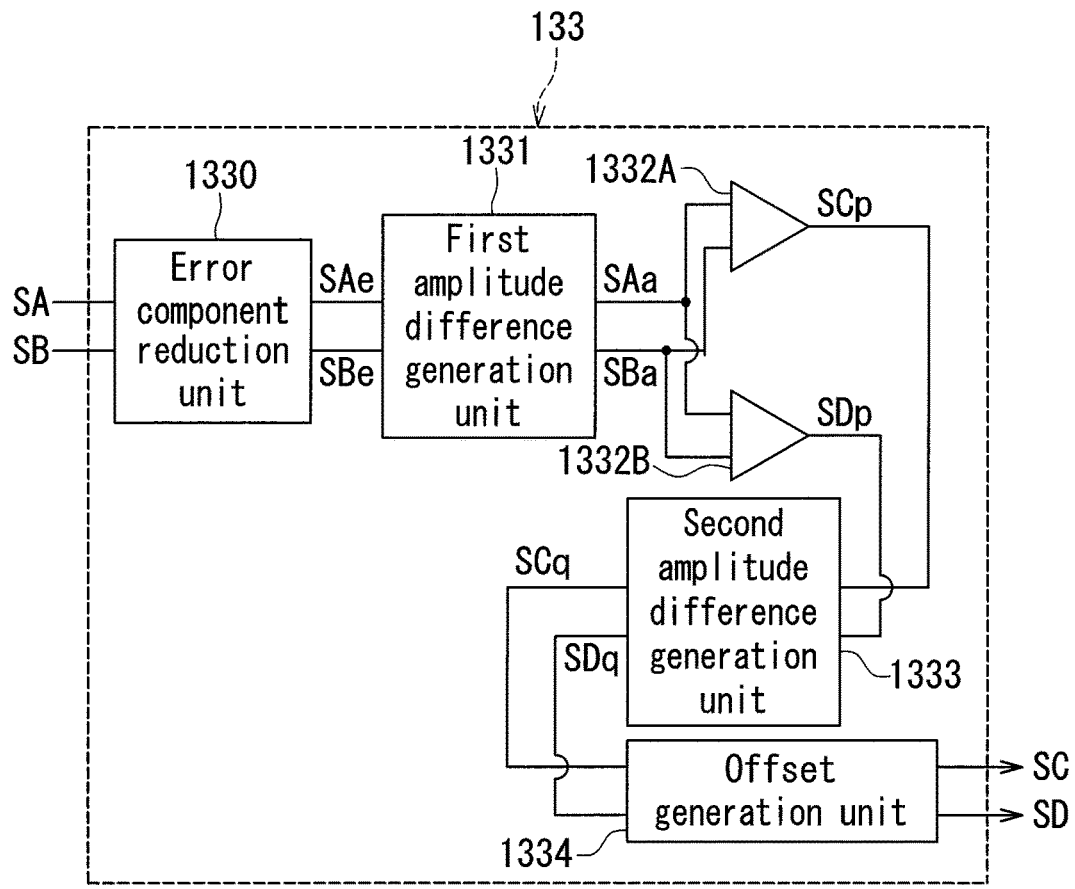
FIG. 11 is a functional block diagram illustrating the configuration of a non-common correction processing unit of an angle detection unit of a third embodiment of the invention.

A third embodiment of the invention will now be described. In the angle sensor 1 according to the third embodiment, the configuration of the non-common correction processing unit 133 is different from that in the second embodiment. FIG. 11 is a functional block diagram illustrating the configuration of the non-common correction processing unit 133. As shown in FIG. 11, the non-common correction processing unit 133 includes an error component reduction unit 1330, a first amplitude difference generation unit 1331, operation units 1332A and 1332B, a second amplitude difference generation unit 1333, and an offset generation unit 1334.

In the present embodiment, the angular error to be reduced by the non-common correction processing contains a third angular error component. When the angle θ to be detected varies with a predetermined period T, the third angular error component varies with a period of ¼ the predetermined period T. Each of the first and second common corrected signals SA and SB contains an error component that causes the third angular error component. This error component is not reducible by the error component reduction unit 1324 of the second embodiment shown in FIG. 10.

The error component that causes the third angular error component will be described in detail below. This error component occurs in the signals SAq and SBq in the same phase, and brings about no variation in the square-sum signal described in relation to the second embodiment. This error component occurs due to, for example, magnetic anisotropies in the same direction occurring in the free layers of the MR elements included in each of the first to fourth detection circuits 110, 120, 130 and 140 (see FIG. 8) or misalignment between the magnet 6 (see FIG. 1) and the detection signal generation unit 102 (see FIG. 8).

Here, we let the ideal component of the first common corrected signal SA be cos θ, and the ideal component of the second common corrected signal SB be sine. When each of the first and second common corrected signals SA and SB contains the error component that causes the third angular error component, the first and second common corrected signals SA and SB are expressed by the following Eqs. (43) and (44), respectively. In Eqs. (43) and (44), $A_2$ represents the amplitude of the third angular error component expressed in radians, and δ represents the phase of the third angular error component.

$$SA = \cos\{\theta - A_2 \cdot \sin(4\theta - \delta)\} \qquad (43)$$
$$= \cos\theta \cdot \cos\{A_2 \cdot \sin(4\theta - \delta)\} + \sin\theta \cdot \sin\{A_2 \cdot \sin(4\theta - \delta)\}$$

$$SB = \sin\{\theta - A_2 \cdot \sin(4\theta - \delta)\} \qquad (44)$$
$$= \sin\theta \cdot \cos\{A_2 \cdot \sin(4\theta - \delta)\} - \cos\theta \cdot \sin\{A_2 \cdot \sin(4\theta - \delta)\}$$

When an angle x expressed in radians is sufficiently small, cos x and sin x can be approximated to 1 and x, respectively. In the present embodiment, the value of $A_2$ is sufficiently small such that $\cos(A_2 \cdot \sin 4\theta)$ and $\sin(A_2 \cdot \sin 4\theta)$ can be approximated to 1 and $A_2 \cdot \sin 4\theta$, respectively. Substituting the approximations into Eqs. (43) and (44), the first and second common corrected signals SA and SB are expressed by the following Eqs. (45) and (46), respectively.

$$SA \approx \cos\theta + \sin\theta \cdot A_2 \cdot \sin(4\theta - \delta) \qquad (45)$$
$$= \cos\theta - (A_2/2)\{\cos(5\theta - \delta) - \cos(-3\theta + \delta)\}$$
$$= \cos\theta + (A_2/2)\cos(3\theta - \delta) - (A_2/2)\cos(5\theta - \delta)$$

$$SB \approx \sin\theta - \cos\theta \cdot A_2 \cdot \sin(4\theta - \delta) \qquad (46)$$
$$= \sin\theta - (A_s/2)\{\sin(5\theta - \delta) - \sin(-3\theta + \delta)\}$$
$$= \sin\theta - (A_2/2)\sin(3\theta - \delta) - (A_2/2)\sin(5\theta - \delta)$$

The first common corrected signal SA contains an error component corresponding to the third harmonic of the ideal component of the first common corrected signal SA, and an error component corresponding to the fifth harmonic of the ideal component of the first common corrected signal SA. The second common corrected signal SB contains an error component corresponding to the third harmonic of the ideal component of the second common corrected signal SB, and an error component corresponding to the fifth harmonic of the ideal component of the second common corrected signal SB. The error component corresponding to the third harmonic contained in each of the first and second common corrected signals SA and SB will be referred to as the second third-harmonic error component. The error component corresponding to the fifth harmonic contained in each of the first and second common corrected signals SA and SB will be referred to as the fifth harmonic error component.

In Eq. (45), "$(A_2/2)\cos(3\theta-\delta)$" is the second third-harmonic error component of the first common corrected signal SA, and "$-(A_2/2)\cos(5\theta-\delta)$" is the fifth harmonic error component of the first common corrected signal SA. In Eq. (46), "$-(A_2/2)\sin(3\theta-\delta)$" is the second third-harmonic error component of the second common corrected signal SB, and "$-(A_2/2)\sin(5\theta-\delta)$" is the fifth harmonic error component of the second common corrected signal SB.

The error component reduction unit 1330 performs processing for correcting the first and second common corrected signals SA and SB to reduce the third angular error components and thereby generating signals SAe and SBe. The error component reduction unit 1330 generates the signal SAe by combining a correction value CA with the first common corrected signal SA. The error component reduction unit 1330 also generates the signal SBe by combining a correction value CB with the second common corrected signal SB. The signals SAe and SBe are determined by the following Eqs. (47) and (48), respectively.

$$SAe = SA + CA \qquad (47)$$

$$SBe = SB + CB \qquad (48)$$

The correction values CA and CB are respectively expressed by the following Eqs. (49) and (50), for example.

$$CA = -F_2 \cdot \cos(3\theta a - \delta) \qquad (49)$$

$$CB = -F_2 \cdot \sin(3\theta a - 180° - \delta) \qquad (50)$$

$F_2$ in Eqs. (49) and (50) can be determined on the basis of the amplitude $A_2$ of the third angular error component. In the present embodiment, the amplitude $A_2$ of the third angular error component is taken as the value $F_2$. The amplitude $A_2$ of the third angular error component can be determined from the waveform of the angular error. The waveform of the angular error can be generated before shipment or use of the angle sensor 1.

θa in Eqs. (49) and (50) is determined by the following Eq. (51) using the first and second common corrected signals SA and SB.

$$\theta a = a \tan(SB/SA) \quad (51)$$

If θa is in the range of 0° to less than 360°, θa in Eq. (51) has two solutions 180° different in value. Which of the two solutions of θa in Eq. (51) is the true value of θa can be determined from the combination of positive and negative signs of SA and SB. The error component reduction unit 1330 determines θa within the range of 0° to less than 360° on the basis of Eq. (51) and the foregoing determination on the combination of positive and negative signs of SA and SB.

The error component reduction unit 1330 may determine θa from the first and second common corrected signals SA and SB using Eq. (51) and then substitute θa into Eqs. (49) and (50) to determine the correction values CA and CB.

Alternatively, the error component reduction unit 1330 may determine the correction values CA and CB in the following manner, without determining θa. Rearranging Eqs. (49) and (50) yields the following Eqs. (52) and (53).

$$CA = -F_2(\cos 3\theta a \cdot \cos(-\delta) - \sin 3\theta a \cdot \sin(-\delta)) \quad (52)$$
$$= -F_2 \cos\delta(4\cos^3\theta a - 3\cos\theta a) + F_2 \sin\delta(4\sin^3\theta a - 3\sin\theta a)$$

$$CB = F_2(\sin 3\theta a \cdot \cos(-\delta) + \cos 3\theta a \cdot \sin(-\delta)) \quad (53)$$
$$= -F_2 \cos\delta(4\sin^3\theta a - 3\sin\theta a) - F_2 \sin\delta(4\cos^3\theta a - 3\cos\theta a)$$

The error component reduction unit 1330 may determine the correction values CA and CB by replacing cos θa in Eqs. (52) and (53) with the first common corrected signal SA and replacing sin θa in Eqs. (52) and (53) with the second common corrected signal SB.

For the correction values CA and CB expressed by Eqs. (49) and (50), the amplitudes thereof are of the same value, i.e., $F_2$, and the periods thereof are of the same value, i.e., ⅓ the predetermined period T. In the present embodiment, the correction values CA and CB may have the same period which is ⅕ the predetermined period T. In this case, the correction values CA and CB are expressed by the following Eqs. (54) and (55), respectively.

$$CA = F_2 \cdot \cos(5\theta a - \delta) \quad (54)$$

$$CB = -F_2 \cdot \sin(5\theta a - 180° - \delta) \quad (55)$$

Now, a description will be given of the operation of components of the non-common correction processing unit 133 other than the error component reduction unit 1330. The first amplitude difference generation unit 1331 operates in the same manner as the first amplitude difference generation unit 331 of the first embodiment, except for the following. In the present embodiment, the first amplitude difference generation unit 1331 adjusts the amplitudes of the signals SAe and SBe to generate signals SAa and SBa. The operation units 1332A and 1332B, the second amplitude difference generation unit 1333, and the offset generation unit 1334 operate in the same manner as the operation units 332A and 332B, the second amplitude difference generation unit 333, and the offset generation unit 334 of the first embodiment, respectively.

As has been described, in the present embodiment, the third angular error component is reduced by the error component reduction unit 1330. According to the present embodiment, even though the first common corrected signal SA contains the second third-harmonic error component and the fifth harmonic error component, the correction value CA may be a value that varies with one period. Likewise, even though the second common corrected signal SB contains the second third-harmonic error component and the fifth harmonic error component, the correction value CB may be a value that varies with one period. The amplitude of the correction value CA and the amplitude of the correction value CB are of the same value, i.e., $F_2$. The period of the correction value CA and the period of the correction value CB are of the same value, i.e., ⅓ or ⅕ the predetermined period T. Accordingly, the present embodiment allows the third angular error component to be reduced by simple processing.

If the determination value dLr is generated using the signals SAe and SBe generated by the error component reduction unit 1330, the variation range of the determination value dLr may become larger than in the case where the determination value dLr is generated using the first and second common corrected signals SA and SB. According to the present embodiment, the error component reduction unit 1330 is included not in the common correction processing unit 132 but in the non-common correction processing unit 133. The present embodiment thereby enables a further reduction of the angular error while narrowing the variation range of the determination value dLr.

The other configuration, function and effects of the third embodiment are the same as those of the first or second embodiment.

Fourth Embodiment

A fourth embodiment of the invention will now be described. The angle sensor 1 according to the fourth embodiment includes a detection signal generation unit 202 and an angle detection unit 203, in place of the detection signal generation unit 2 and the angle detection unit 3 of the first embodiment.

Figure 12:
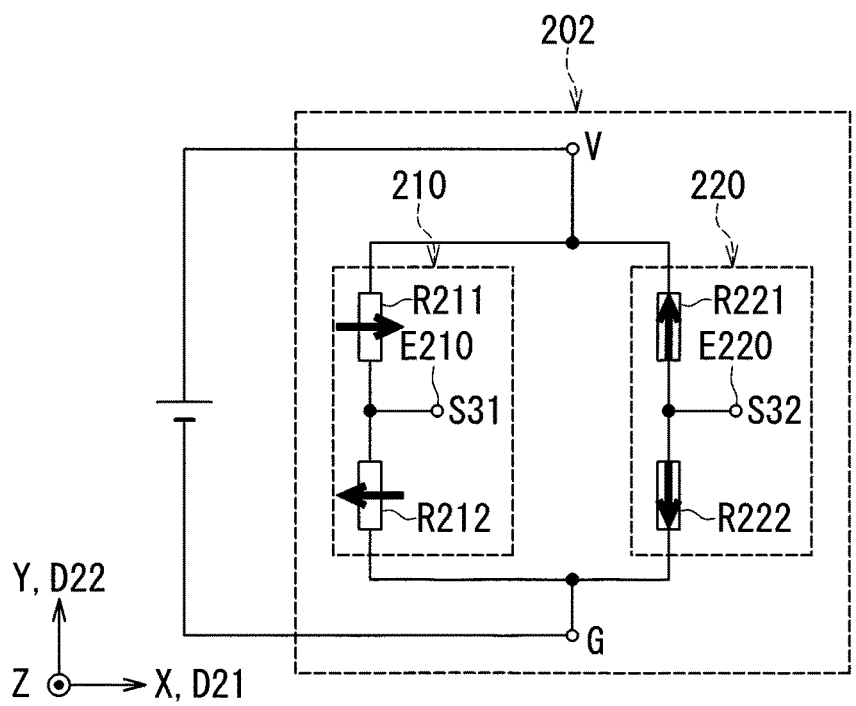
FIG. 12 is a circuit diagram illustrating the configuration of a detection signal generation unit of an angle sensor according to a fourth embodiment of the invention.

First, the detection signal generation unit 202 will be described with reference to FIG. 12. FIG. 12 is a circuit diagram illustrating the configuration of the detection signal generation unit 202. The detection signal generation unit 202 generates a first detection signal S31 and a second detection signal S32 each having a correspondence with an angle θ to be detected. The detection signal generation unit 202 includes a first detection circuit 210 for generating the first detection signal S31 and a second detection circuit 220 for generating the second detection signal S32. Each of the first and second detection circuits 210 and 220 includes at least one magnetic detection element for detecting a rotating magnetic field MF. The detection signal generation unit 202 further includes a power supply port V and a ground port G. A power supply voltage of predetermined magnitude, such as 5 volts, is applied between the power supply port V and the ground port G.

As the direction DM of the rotating magnetic field MF rotates with a predetermined period T, the angle θ to be detected varies with the predetermined period T. In such a case, the first and second detection signals S31 and S32 both vary periodically with a signal period equal to the predetermined period T. The first and second detection signals S31 and S32 are different in phase from each other.

The first detection circuit 210 includes a pair of serially connected magnetic detection elements R211 and R212, and an output port E210. One end of the magnetic detection element R211 is connected to the power supply port V. The other end of the magnetic detection element R211 is connected to one end of the magnetic detection element R212 and the output port E210. The other end of the magnetic detection element R212 is connected to the ground port G. The output port E210 outputs the first detection signal S31 which corresponds to the potential at the connection point between the magnetic detection elements R211 and R212.

The second detection circuit 220 includes a pair of serially connected magnetic detection elements R221 and R222, and an output port E220. One end of the magnetic detection element R221 is connected to the power supply port V. The other end of the magnetic detection element R221 is connected to one end of the magnetic detection element R222 and the output port E220. The other end of the magnetic detection element R222 is connected to the ground port G. The output port E220 outputs the second detection signal S32 which corresponds to the potential at the connection point between the magnetic detection elements R221 and R222.

The magnetic detection elements R211, R212, R221 and R222 are configured in the same manner as the magnetic detection elements R11, R12, R21, R22, R31 and R32 of the first embodiment except for the magnetization directions of the magnetization pinned layers.

In the first detection circuit 210, the magnetization pinned layers of the MR elements included in the magnetic detection element R211 are magnetized in the X direction. This magnetization direction will hereinafter be referred to as the first direction D21. The magnetization pinned layers of the MR elements included in the magnetic detection element R212 are magnetized in the opposite direction to the first direction D21, that is, in the −X direction. In the first detection circuit 210, the potential at the connection point between the magnetic detection elements R211 and R212 varies depending on the strength of a component in the first direction D21 of the rotating magnetic field MF. Thus, the first detection circuit 210 detects the strength of the component in the first direction D21 of the rotating magnetic field MF and outputs a signal indicative of the strength as the first detection signal S31. The strength of the component in the first direction D21 of the rotating magnetic field MF has a correspondence with the angle θ to be detected.

In the second detection circuit 220, the magnetization pinned layers of the MR elements included in the magnetic detection element R221 are magnetized in the Y direction. This magnetization direction will hereinafter be referred to as the second direction D22. The magnetization pinned layers of the MR elements included in the magnetic detection element R222 are magnetized in the opposite direction to the second direction D22, that is, in the −Y direction. In the second detection circuit 220, the potential at the connection point between the magnetic detection elements R221 and R222 varies depending on the strength of a component in the second direction D22 of the rotating magnetic field MF. Thus, the second detection circuit 220 detects the strength of the component in the second direction D22 of the rotating magnetic field MF and outputs a signal indicative of the strength as the second detection signal S32. The strength of the component in the second direction D22 of the rotating magnetic field MF has a correspondence with the angle θ to be detected.

In the light of the production accuracy of the MR elements or other factors, the magnetization directions of the magnetization pinned layers of the plurality of MR elements in the detection circuits 210 and 220 may be slightly different from those described above.

When the angle θ to be detected varies with the predetermined period T, each of the detection signals S31 and S32 contains an ideal component and an error component. The ideal components of the detection signals S31 and S32 are different in phase from each other and have a predetermined phase relationship with each other. In the present embodiment, in particular, the ideal components of the detection signals S31 and S32 are different in phase from each other by 90°.

Figure 13:
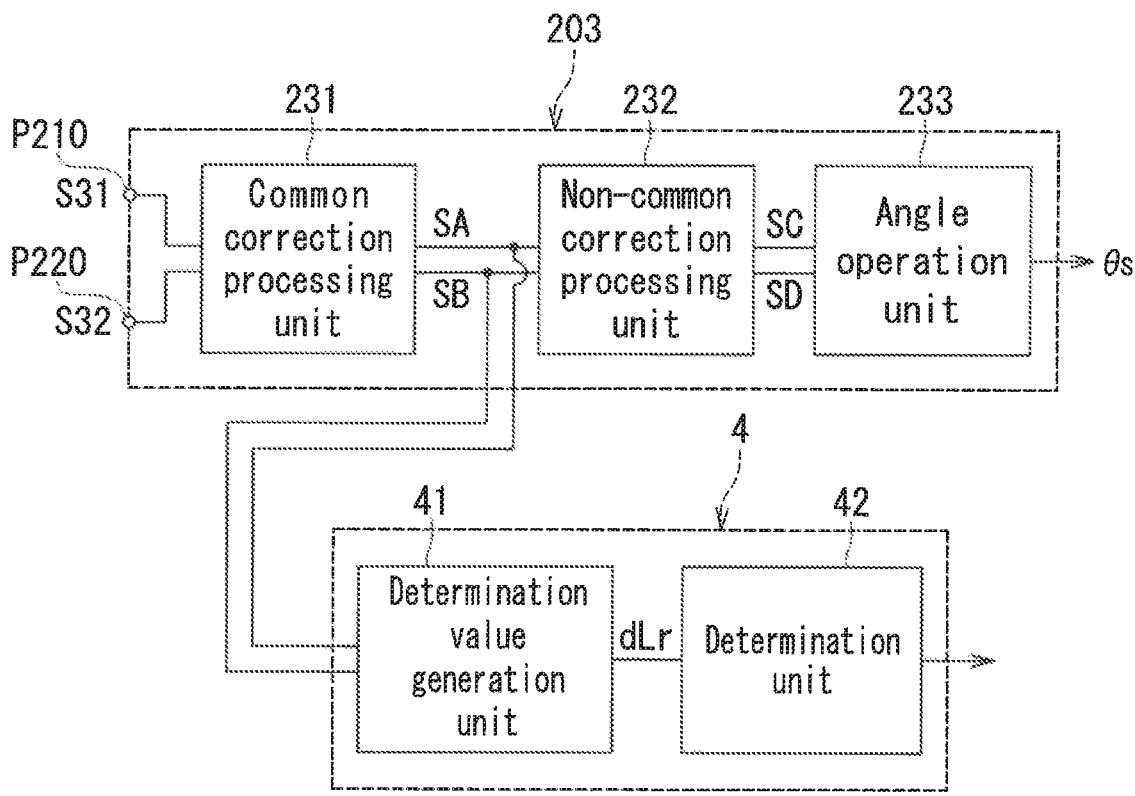
FIG. 13 is a functional block diagram illustrating the configuration of an angle detection unit and a condition determination apparatus of the angle sensor according to the fourth embodiment of the invention.

Reference is now made to FIG. 13 to describe the angle detection unit 203. FIG. 13 is a functional block diagram illustrating the configuration of the angle detection unit 203 and the condition determination apparatus 4. The angle detection unit 203 generates a detected angle value θs on the basis of the first and second detection signals S31 and S32 generated by the detection signal generation unit 202. The detected angle value θs has a correspondence with an angle θ to be detected. The condition determination apparatus 4 is configured and operates in the same manner as in the first embodiment. The angle detection unit 203 and the condition determination apparatus 4 can be implemented by an application-specific integrated circuit (ASIC) or a microcomputer, for example.

The angle detection unit 203 includes input ports P210 and P220, a common correction processing unit 231, a non-common correction processing unit 232, and an angle operation unit 233. The first and second detection signals S31 and S32 are received at the input ports P210 and P220, respectively.

The common correction processing unit 231 is configured and operates in the same manner as the common correction processing unit 132 of the second embodiment shown in FIG. 10. In the present embodiment, the first and second detection signals S31 and S32 themselves function as a plurality of uncorrected signals. Thus, the common correction processing unit 231 performs common correction processing to convert the first and second detection signals S31 and S32 into first and second common corrected signals SA and SB to be used for the generation of the detected angle value θs and the generation of the determination value dLr.

The non-common correction processing unit 232 may be configured and operate in the same manner as the non-common correction processing unit 133 of the second or third embodiment. The angle operation unit 233 is configured and operates in the same manner as the angle operation unit 34 of the first embodiment.

The other configuration, function and effects of the fourth embodiment are the same as those of the second or third embodiment.

Fifth Embodiment

Figure 14:
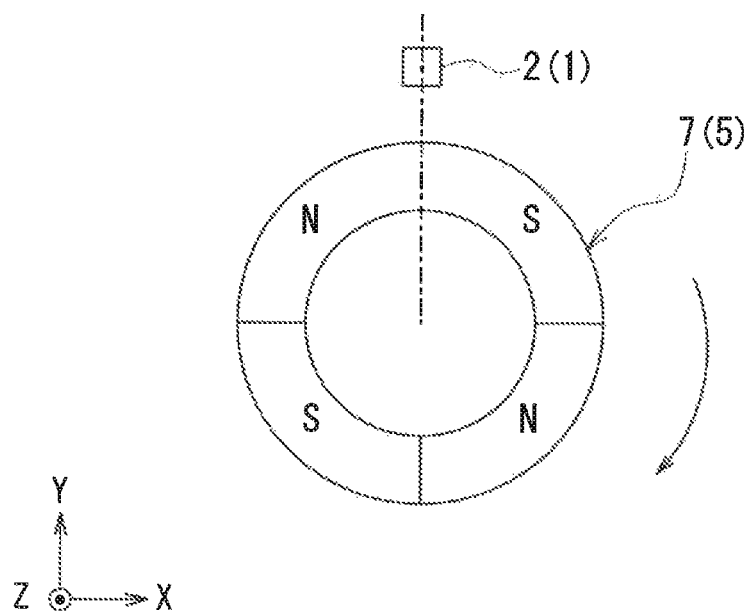
FIG. 14 is an explanatory diagram illustrating the general configuration of an angle sensor system according to a fifth embodiment of the invention.

An angle sensor system according to a fifth embodiment of the invention will now be described with reference to FIG. 14. FIG. 14 is an explanatory diagram illustrating the general configuration of the angle sensor system according to the fifth embodiment. As in the first embodiment, the physical information generation unit 5 in the fifth embodiment is a magnetic field generation unit for generating a rotating magnetic field as physical information. As an example of the magnetic field generation unit, FIG. 14 shows a magnet 7 including one or more pairs of N and S poles arranged alternately in an annular shape. In the example shown in FIG. 14, the plane of the drawing of FIG. 14 is an XY plane, and a direction perpendicular to the plane is the Z direction.

The angle sensor 1 according to the present embodiment detects the direction of a rotating magnetic field generated from the outer circumference of the magnet 7. The relative position of the magnet 7 with respect to the angle sensor 1 varies in such a way as to rotate about a central axis. This is accomplished by a rotation of the magnet 7 about a predetermined central axis parallel to the Z direction in response to a rotational movement of a moving object (not illustrated). The direction of the rotating magnetic field to be detected by the angle sensor 1 rotates about the central axis (the Z direction) as the relative position of the magnet 7 with respect to the angle sensor 1 varies. In the example shown in FIG. 14, the magnet 7 rotates clockwise, and the direction of the rotating magnetic field to be detected by the angle sensor 1 rotates counterclockwise.

The configuration of the angle sensor 1 according to the present embodiment may be the same as that in any of the first to fourth embodiments. The detection circuits in the angle sensor 1 are located in the same position in the direction of rotation of the magnet 7.

The other configuration, function and effects of the fifth embodiment are the same as those of any of the first to fourth embodiments.

Sixth Embodiment

Figure 15:
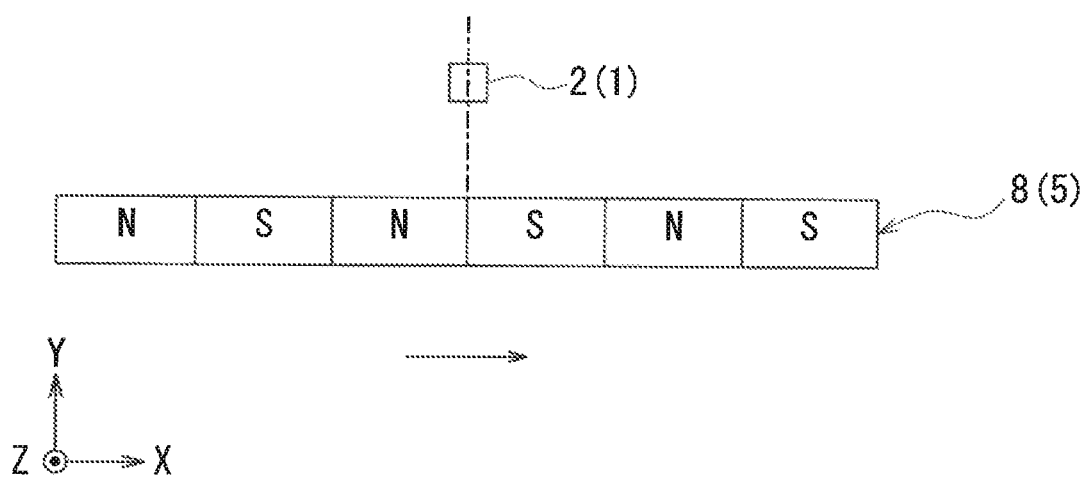
FIG. 15 is an explanatory diagram illustrating the general configuration of an angle sensor system according to a sixth embodiment of the invention.

An angle sensor system according to a sixth embodiment of the invention will now be described with reference to FIG. 15. FIG. 15 is an explanatory diagram illustrating the general configuration of the angle sensor system according to the sixth embodiment. As in the first embodiment, the physical information generation unit 5 in the sixth embodiment is a magnetic field generation unit for generating a rotating magnetic field as physical information. As an example of the magnetic field generation unit, FIG. 15 shows a magnet 8 including a plurality of pairs of N and S poles arranged alternately in a liner configuration. In the example shown in FIG. 15, the plane of the drawing of FIG. 15 is an XY plane, and a direction perpendicular to the plane is the Z direction. The N and S poles of the magnet 8 are aligned in the X direction.

The angle sensor 1 according to the present embodiment detects the direction of a rotating magnetic field generated from the periphery of the magnet 8. The relative position of the magnet 8 with respect to the angle sensor 1 varies in a linear fashion. This is accomplished by a linear movement of either one of the angle sensor 1 and the magnet 8 in the X direction in response to the movement of a moving object (not illustrated). The direction of the rotating magnetic field to be detected by the angle sensor 1 rotates about the Z axis as the relative position of the magnet 8 with respect to the angle sensor 1 varies.

The configuration of the angle sensor 1 according to the present embodiment may be the same as that in any of the first to fourth embodiments. The detection circuits in the angle sensor 1 are located in the same position in the X direction.

The other configuration, function and effects of the sixth embodiment are the same as those of any of the first to fourth embodiments.

The present invention is not limited to the foregoing embodiments, and various modifications may be made thereto. For example, the present invention is applicable not only to magnetic angle sensors but to all types of angle sensors including, for example, optical angle sensors, and to all types of angle sensor systems. In the case of an angle sensor system that includes an optical angle sensor and an optical scale, the physical information is optical information that varies depending on the relative position of the optical scale with respect to the angle sensor. In such a case, the angle to be detected is, for example, an angle that represents the relative position of the optical scale with respect to the angle sensor with one pitch of the optical scale as 360°.

Obviously, many modifications and variations of the present invention are possible in the light of the above teachings. Thus, it is to be understood that, within the scope of the appended claims and equivalents thereof, the invention may be practiced in other embodiments than the foregoing most preferable embodiments.

What is claimed is:
1. An angle sensor comprising:
a detection signal generation circuit that generates a plurality of detection signals each of which has a correspondence with a target angle to be detected;
an angle detection circuit that generates an angle detection value on the basis of the plurality of detection signals, the angle detection value having a correspondence with the target angle to be detected; and
a condition determination circuit, wherein
the condition determination circuit generates a determination value to be used for determining whether the angle sensor is in a predetermined condition; and determines whether the angle sensor is in the predetermined condition on the basis of the determination value,
the angle detection circuit performs correction processing for converting a plurality of uncorrected signals, which have correspondence with the plurality of detection signals, into a plurality of common corrected signals to be used for the generation of the angle detection value and the generation of the determination value, and non-common correction processing for converting the plurality of common corrected signals into a first angle operation signal and a second angle operation signal which are used for an operation for generating the angle detection value and not used for the generation of the determination value, and generates the angle detection value using the first and second angle operation signals,
the condition determination circuit is configured to generate the determination value on the basis of the plurality of common corrected signals,
the correction processing is processing for converting the plurality of uncorrected signals into the plurality of common corrected signals so that an angular error occurring in the angle detection value is reduced relative to a non-corrected angle detection value, wherein the non-corrected angle detection value corresponds to the angle detection value that is not corrected generated using the plurality of uncorrected signals without the application of the correction processing, and so that a range over which the determination value varies depending on the target angle to be detected is narrower than a range over which a non-corrected determination value varies, wherein the non-corrected determination value corresponds to the determination value that is not corrected generated using the plurality of uncorrected signals without the application of the correction processing, and the non-common correction processing is processing for reducing an angular error occurring in the angle detection value relative to the case where the angle detection value is generated using the plurality of common corrected signals without the application of the iron-common correction processing.

2. The angle sensor according to claim 1, wherein the predetermined condition is a condition in which the angle sensor has not failed.

3. The angle sensor according to claim 1, wherein the plurality of common corrected signals are a first common corrected signal and a second common corrected signal, when the target angle to be detected varies with a predetermined period, each of the first and second common corrected signals contains a predetermined component which varies periodically in such a manner as to trace a predetermined sinusoidal curve, the predetermined component of the first common corrected signal and the predetermined component of the second common corrected signal have a phase difference of 90°, the first common corrected signal and the second common corrected signal are of the same amplitude, and the condition determination circuit is configured to generate the determination value by performing an operation including determining a sum of a square of the first common corrected signal and a square of the second common corrected signal.

4. The angle sensor according to claim 1, wherein the target angle to be detected is an angle that a direction of a rotating magnetic field in a reference position forms with respect to a reference direction, the detection signal generation circuit includes a plurality of detection circuits for generating the plurality of detection signals, and each of the plurality of detection circuits includes at least one magnetic detection element for detecting the rotating magnetic field.

5. The angle sensor according to claim 4, wherein the at least one magnetic detection element includes a plurality of magnetoresistance elements connected in series, and each of the plurality of magnetoresistance elements includes a magnetization pinned layer whose magnetization direction is pinned, a free layer whose magnetization direction varies depending on the direction of the rotating magnetic field, and a nonmagnetic layer located between the magnetization pinned layer and the free layer.

6. The angle sensor according to claim 1, wherein the correction processing includes processing for correcting offsets of the plurality of uncorrected signals.

7. The angle sensor according to claim 1, wherein the correction processing includes processing for normalizing the amplitudes of the plurality of uncorrected signals.

8. The angle sensor according to claim 1, wherein the plurality of uncorrected signals are a first uncorrected signal and a second uncorrected signal, the plurality of common corrected signals are a first common corrected signal and a second common corrected signal, when the target angle to be detected varies with a predetermined period, each of the first uncorrected signal, the second uncorrected signal, the first common corrected signal and the second common corrected signal contains a predetermined component which varies periodically in such a manner as to trace a predetermined sinusoidal curve, and the correction processing includes processing for making a phase difference between the predetermined components of the first and second common corrected signals be 90° irrespective of a phase difference between the predetermined components of the first and second uncorrected signals, and making the first and second common corrected signals be of the same amplitude.

9. The angle sensor according to claim 1, wherein when the target angle to be detected varies with a predetermined period, each of the plurality of detection signals contains a predetermined component which varies periodically in such a manner as to trace a predetermined sinusoidal curve, and an error component corresponding to a third harmonic of the predetermined component, and the angle detection circuit performs conversion processing for converting the plurality of detection signals into the plurality of uncorrected signals each containing a reduced error component relative to the error component contained in each of the plurality of detection signals.

10. The angle sensor according to claim 1, wherein when the target angle to be detected varies with a predetermined period, each of the plurality of uncorrected signals contains a predetermined component which varies periodically in such a manner as to trace a predetermined sinusoidal curve, and an error component corresponding to a third harmonic of the predetermined component, and the correction processing includes processing for causing each of the plurality of common corrected signals to contain a reduced error component relative to the error component contained in each of the plurality of uncorrected signals.

11. The angle sensor according to claim 1, wherein the angular error to be reduced by the non-common correction processing contains at least one of a first angular error component and a second angular error component, and when the target angle to be detected varies with a predetermined period, the first angular error component varies with a period equal to the predetermined period, and the second angular error component varies with a period of ½ the predetermined period.

12. The angle sensor according to claim 1, wherein the angular error to be reduced by the non-common correction processing contains a third angular error component, and when the target angle to be detected varies with a predetermined period, the third angular error component varies with a period of ¼ the predetermined period.

13. An angle sensor system comprising:

the angle sensor according to claim 1; and a magnet for generating physical information having a correspondence with the target angle to be detected, wherein the detection signal generation circuit is configured to generate the plurality of detection signals by detecting the physical information.

14. The angle sensor system according to claim 13, wherein the magnet generates a rotating magnetic field as the physical information, and the target angle to be detected is an angle that a direction of the rotating magnetic field in a reference position forms with respect to a reference direction.

15. The angle sensor system according to claim 13, wherein a relative position of the magnet with respect to the angle sensor varies so that the target angle to be detected varies.

16. The angle sensor system according to claim 15, wherein the relative position of the magnet with respect to the angle sensor varies in such a way as to rotate about a central axis.

17. The angle sensor system according to claim 15, wherein the relative position of the magnet with respect to the angle sensor varies in a linear fashion.

18. An angle sensor comprising:
a detection signal generation circuit that generates a plurality of detection signals each of which has a respective correspondence with a target angle to be detected;
an angle detection circuit that converts the plurality of detection signals into a plurality of corrected signals, converts the plurality of corrected signals into first and second angle operation signals, and generates an angle detection value using the first and second angle operation signals, the angle detection value having a correspondence with the target angle to be detected; and
a condition determination circuit that generates a determination value based on the corrected signals; and determines whether the angle sensor is in a predetermined condition on the basis of the determination value,
wherein an angular error occurring in the angle detection value is reduced relative to a non-corrected angle detection value, wherein the non-corrected angle detection value corresponds to a value that is directly generated from the plurality of detection signals without converting the detection signals into the corrected signals and without converting the corrected signals into the first and second angle operation signals, and
wherein a range over which the determination value varies depending on the target angle to be detected is narrower than a range over which a non-corrected determination value varies depending on the target angle to be detected, wherein the non-corrected determination value corresponds to a value that is directly generated from the plurality of detection signals without converting the detection signals into the corrected signals.

19. An angle sensor comprising:
a detection signal generation circuit that generates a plurality of detection signals each of which has a respective correspondence with a target angle to be detected;
an angle detection circuit that converts the plurality of detection signals into a plurality of corrected signals, converts the plurality of corrected signals into first and second angle operation signals, and generates an angle detection value using the first and second angle operation signals; and
a condition determination circuit that generates a determination value based on the corrected signals; and determines whether the angle sensor is in a predetermined condition on the basis of the determination value.

* * * * *